US010263982B2

(12) United States Patent
Kim

(10) Patent No.: US 10,263,982 B2
(45) Date of Patent: Apr. 16, 2019

(54) FOLDABLE DEVICE AND METHOD OF CONTROLLING THE SAME

(71) Applicant: SAMSUNG ELECTRONICS CO., LTD., Gyeonggi-do (KR)

(72) Inventor: Dae-myung Kim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 64 days.

(21) Appl. No.: 15/243,032

(22) Filed: Aug. 22, 2016

(65) Prior Publication Data
US 2016/0381014 A1    Dec. 29, 2016

Related U.S. Application Data

(63) Continuation-in-part of application No. 15/086,408, filed on Mar. 31, 2016, now abandoned.
(Continued)

(30) Foreign Application Priority Data

May 8, 2015    (KR) .................. 10-2015-0064621

(51) Int. Cl.
G06F 1/16        (2006.01)
G06K 9/00        (2006.01)
(Continued)

(52) U.S. Cl.
CPC ........ *H04L 63/0861* (2013.01); *G06F 1/1616* (2013.01); *G06F 1/1652* (2013.01);
(Continued)

(58) Field of Classification Search
CPC ... H04L 63/0861; H04W 12/06; G06F 1/1616
(Continued)

(56) References Cited

U.S. PATENT DOCUMENTS 6,853,739 B2 *   2/2005   Kyle ..................... G06F 21/32
                                                        340/5.83
8,627,237 B2    1/2014   Chaudhri et al.
(Continued)

FOREIGN PATENT DOCUMENTS

JP      2010-175999 A      8/2010
KR    10-2013-0055729 A    5/2013
(Continued)

OTHER PUBLICATIONS

Communication dated Feb. 3, 2017, issued by European Patent Office in counterpart European Application No. 16184971.6.
(Continued)

Primary Examiner — Jason K Gee
Assistant Examiner — Angela R Holmes
(74) Attorney, Agent, or Firm — Sughrue Mion, PLLC

(57) ABSTRACT

A foldable device includes: a display; a touch panel configured to detect a touch input; a sensing interface configured to detect an angle of the foldable device; and a controller configured to activate the display unit when the angle detected by the sensing unit as the foldable device is unfolded is equal to or greater than a first angle, and activate the touch panel when the angle detected by the sensing unit is equal to or greater than a second angle.

16 Claims, 21 Drawing Sheets

Related U.S. Application Data

(60) Provisional application No. 62/140,815, filed on Mar. 31, 2015.

(51) Int. Cl.
*G06F 3/041* (2006.01)
*H04L 29/06* (2006.01)
*H04W 12/06* (2009.01)

(52) U.S. Cl.
CPC ............ *G06F 3/041* (2013.01); *H04W 12/06* (2013.01); *G06K 9/00006* (2013.01); *G06K 9/00597* (2013.01)

(58) Field of Classification Search
USPC ............................................................ 726/7
See application file for complete search history.

(56) References Cited

U.S. PATENT DOCUMENTS

| | | | |
|---|---|---|---|
| 9,089,270 B2 | 7/2015 | Song et al. | |
| 9,170,678 B2 | 10/2015 | Cho et al. | |
| 9,198,585 B2 | 12/2015 | Lim et al. | |
| 9,318,070 B2 | 4/2016 | Park et al. | |
| 2010/0026453 A1* | 2/2010 | Yamamoto | G06F 21/32 340/5.83 |
| 2013/0005303 A1 | 1/2013 | Song et al. | |
| 2013/0005310 A1 | 1/2013 | Lim et al. | |
| 2014/0062976 A1 | 3/2014 | Park et al. | |
| 2014/0078047 A1 | 3/2014 | Seo et al. | |
| 2014/0123275 A1* | 5/2014 | Azar | H04W 12/06 726/19 |
| 2014/0247229 A1 | 9/2014 | Cho et al. | |
| 2016/0026329 A1 | 1/2016 | Fadell et al. | |
| 2016/0187994 A1 | 6/2016 | La et al. | |

FOREIGN PATENT DOCUMENTS

| | | |
|---|---|---|
| KR | 10-2013-0085528 A | 7/2013 |
| KR | 10-2014-0031679 A | 3/2014 |
| KR | 10-2014-0036499 A | 3/2014 |
| KR | 10-2014-0108919 A | 9/2014 |
| KR | 10-2014-0115226 A | 9/2014 |

OTHER PUBLICATIONS

Written Opinion dated Jul. 8, 2016 issued by International Searching Authority in counterpart International Application No. PCT/KR2016/003354 (PCT/ISA/237).

International Search Report dated Jul. 8, 2016 issued by International Searching Authority in counterpart International Application No. PCT/KR2016/003354 (PCT/ISA/210).

Communication dated Feb. 16, 2018, issued by the European Patent Office in counterpart European Patent Application No. 16184971.6.

Communication dated Apr. 11, 2018, issued by the Korean Intellectual Property Office in counterpart Korean Patent Application No. 10-2016-0105497.

* cited by examiner

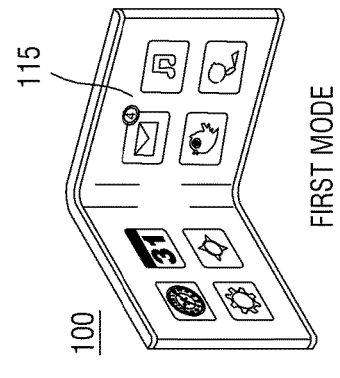
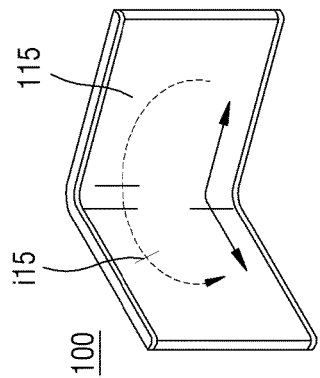
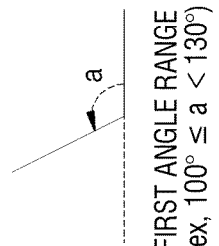
FIG. 9A
FIRST MODE
FIRST ANGLE RANGE
(ex, 100° ≤ a < 130°)
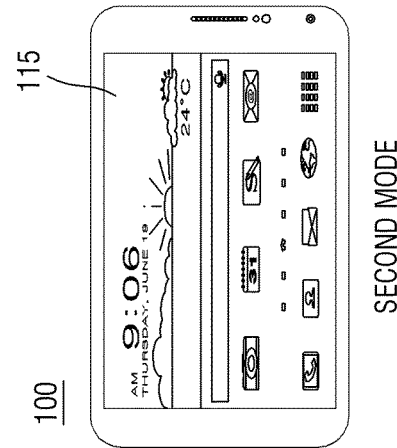
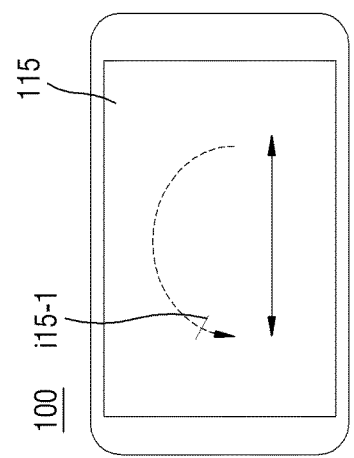
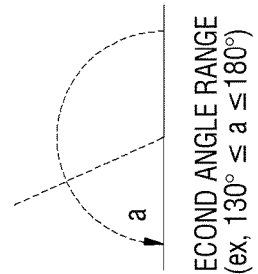
FIG. 9B
SECOND MODE
SECOND ANGLE RANGE
(ex, 130° ≤ a ≤ 180°)

Unlock State

FIG. 17
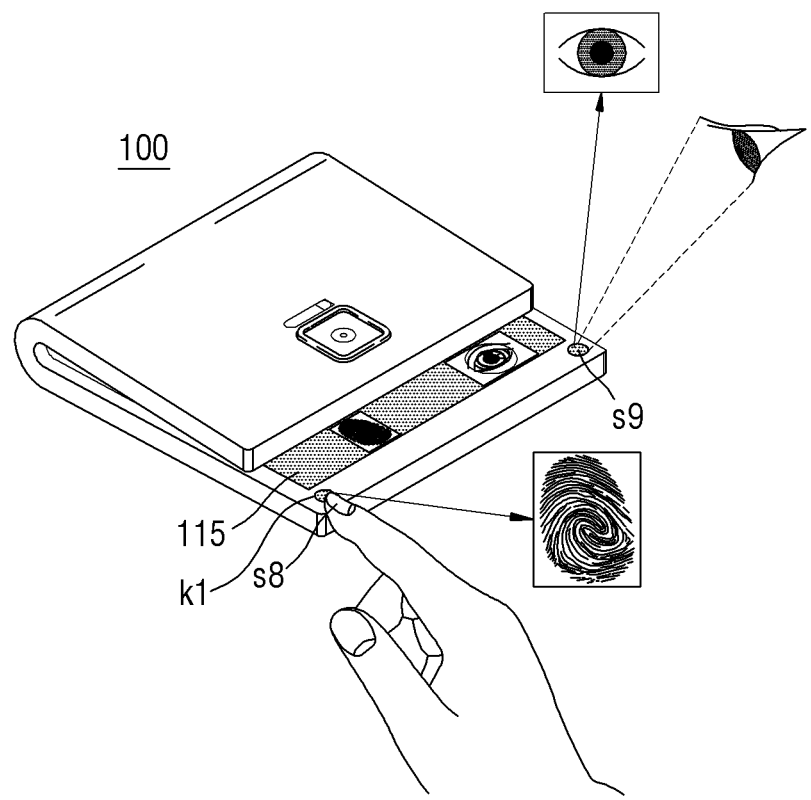
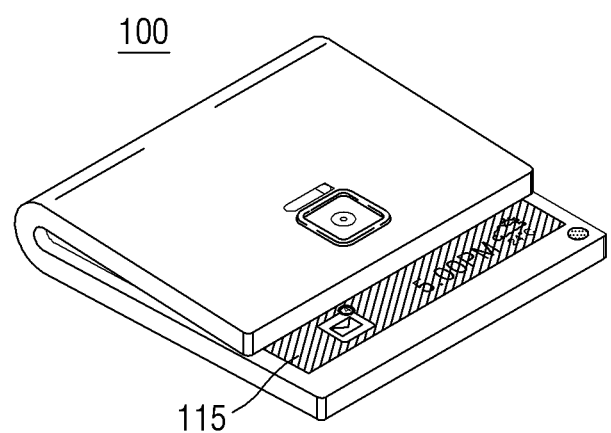
Unlock State

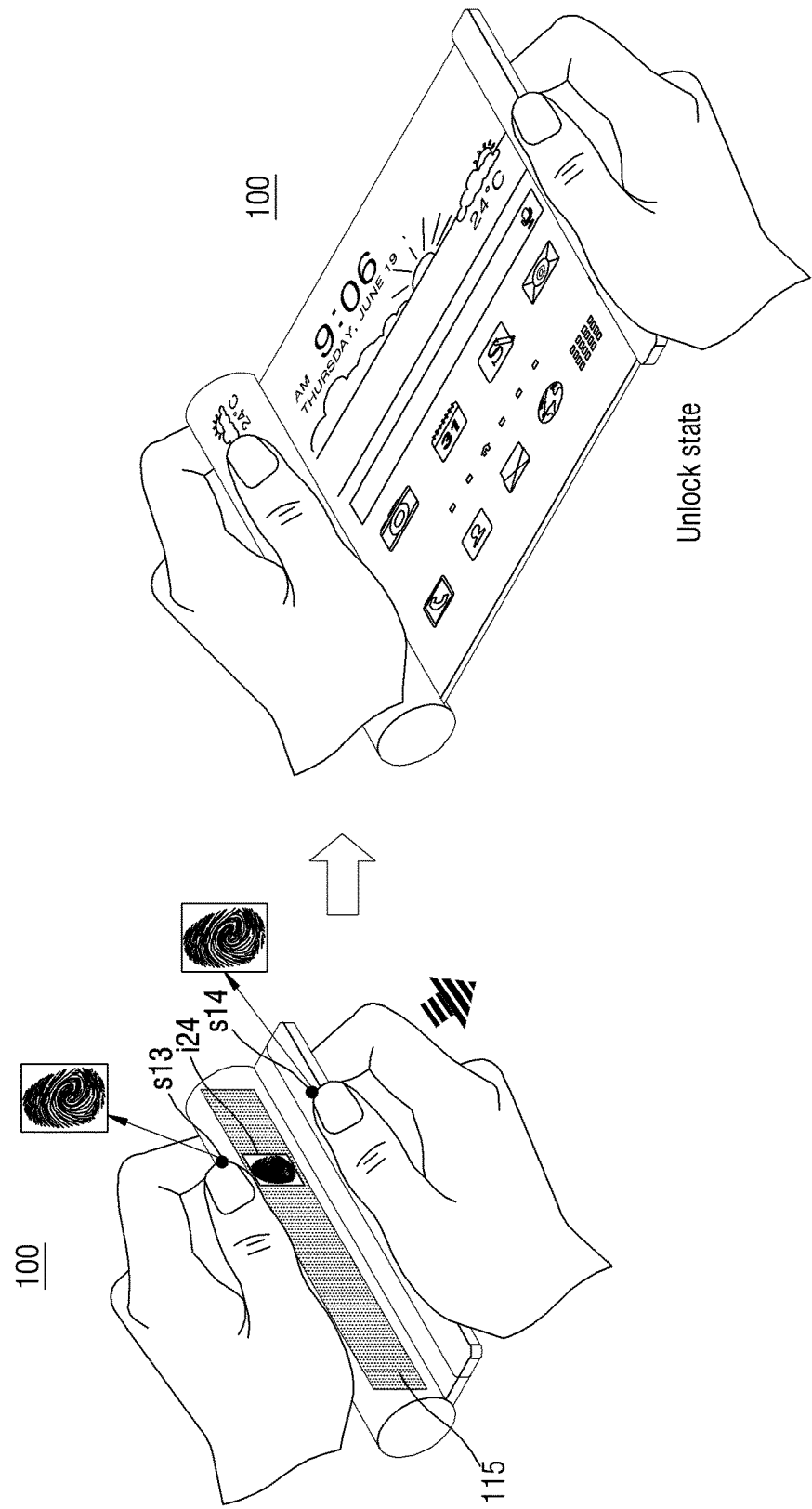

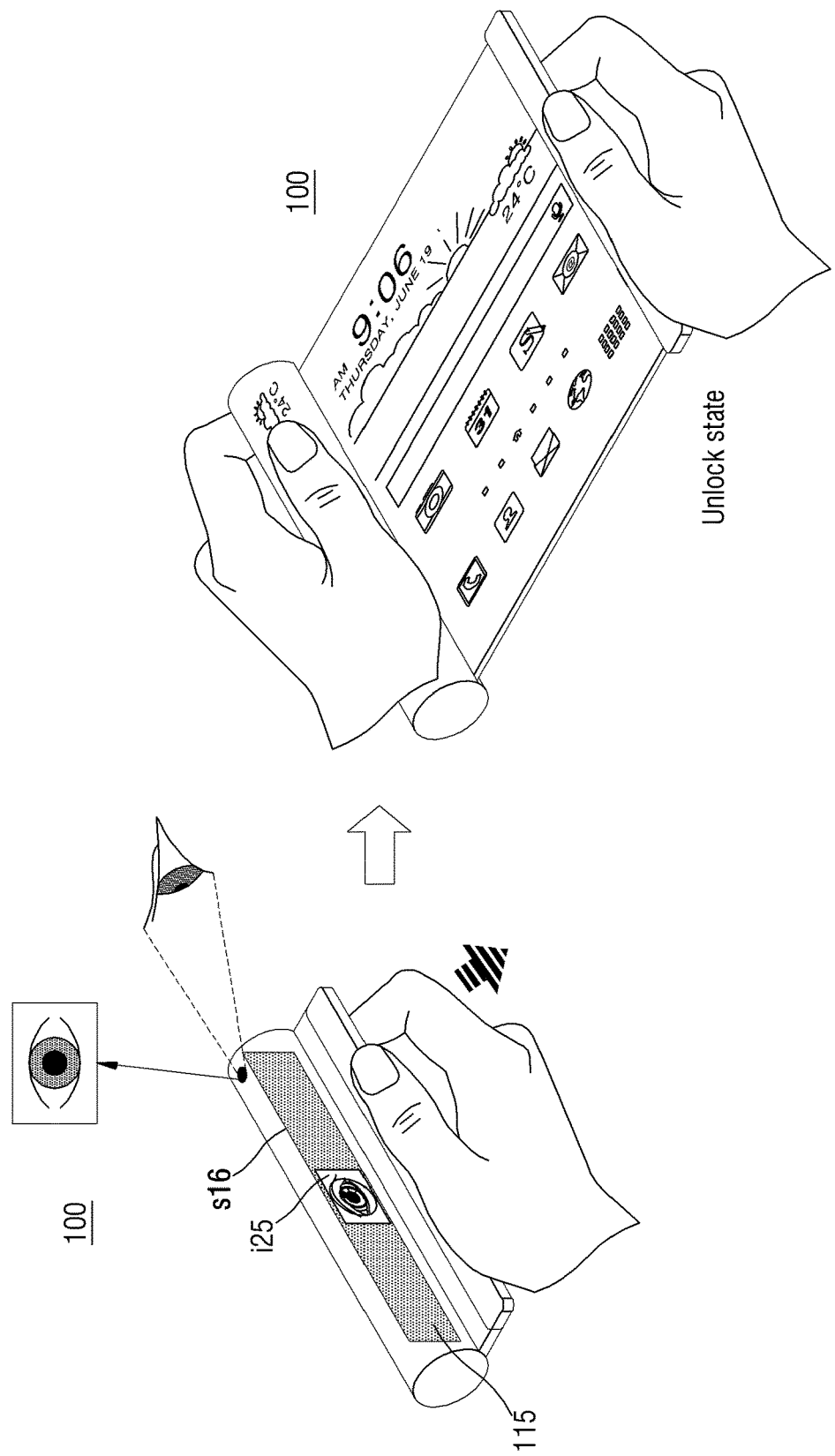

FOLDABLE DEVICE AND METHOD OF CONTROLLING THE SAME

CROSS-REFERENCE TO RELATED APPLICATIONS

This application is a continuation-in-part (CIP) application of U.S. application Ser. No. 15/086,408, filed on Mar. 31, 2016, and claims the benefit of U.S. Provisional Application No. 62/140,815, filed on Mar. 31, 2015, in the U.S. Patent and Trademark Office, and claims priority from Korean Patent Application No. 10-2015-0064621, filed on May 8, 2015, in the Korean Intellectual Property Office, the disclosures of which are incorporated herein by reference in their entireties.

BACKGROUND

1. Field

Methods and apparatuses consistent with exemplary embodiments relate to foldable devices in which a lock state of a display unit is controlled, and a method of controlling the foldable devices.

2. Description of the Related Art

Due to the advancement of display technologies, various display apparatuses, such as flexible displays and transparent displays, have been developed. A device including a flexible display may be folded or unfolded by a user, and thus the size of the device may be reduced.

A flexible display may be realized in a form of an organic electroluminescent light-emitting display apparatus or a liquid crystal display (LCD) apparatus. The flexible display may be manufactured by using a flexible material, for example, by replacing a glass substrate of a general LCD apparatus or a general organic electroluminescent light-emitting display apparatus with a plastic film. Also, a foldable device may be manufactured by using a flexible material in at least a foldable region of the general LCD apparatus or the general organic electroluminescent light-emitting display apparatus.

Flexible displays may be used in electronic books that may replace magazines, textbooks, publications, and comic books. Flexible displays may be used in new portable information technology (IT) products, such as subminiature personal computers (PCs) having a foldable or rollable display, and smart cards for checking information in real-time.

Therefore, a user interface that reflects characteristics of the foldable device would be useful.

SUMMARY

According to one or more exemplary embodiments, there is provided a foldable display in which a lock state of a display unit is controlled, and a method of controlling the foldable device.

Additional aspects will be set forth in part in the description which follows and, in part, will be apparent from the description, or may be learned by practice of exemplary embodiments.

According to an aspect of an exemplary embodiment, there is provided a foldable device including a display; a touch panel configured to detect a touch input; a sensing interface configured to detect an angle of the foldable device; and a controller configured to activate the display in response to the detected angle being equal to or greater than a first angle, and activate the touch panel in response to the detected angle being equal to or greater than a second angle.

The controller may be further configured to display, on the display, an image indicating that the foldable device is in a lock state in response to the angle of the foldable device being equal to or greater than the first angle.

The controller may be further configured to control the display to change or move the image in response to detecting that the unfolding angle of the foldable device is increasing.

The controller may be further configured to release the foldable device from the lock state and display, on the display, a pre-set wallpaper in response to the angle of the foldable device being equal to or greater than the second angle.

The controller may be further configured to display a first mode wallpaper in response to the angle of the foldable device being within a first angle range, and display a second mode wallpaper in response to the angle of the foldable device being within a second angle range.

The foldable device may further include a biometric information recognizer configured to obtain biometric information, wherein the controller may be further configured to perform user authentication by using the biometric information, and in response to determining that the user authentication has succeeded, activate the touch panel.

The controller may be further configured to, in response to the sensing interface detecting an operation of unfolding the foldable device from a folded state, activate the biometric information recognizer and obtain the biometric information.

The controller may be further configured to, in response to the angle of the foldable device being equal to or greater than the first angle, provide, on the display, an interface indicating that the user authentication is being performed.

The biometric information recognizer may include at least one of a fingerprint recognizing sensor and an iris recognizing camera.

According to an aspect of another exemplary embodiment, there is provided a method of releasing a foldable device from a lock state, the method including: activating a display in response to an angle, detected by a sensing interface as the foldable device is unfolded, being equal to or greater than a first angle; and activating a touch panel for detecting a touch input in response to the angle, detected by the sensing interface, being equal to or greater than a second angle.

The method may further include displaying an image indicating that the foldable device is in a lock state in response to the angle of the foldable device being equal to or greater than the first angle.

The method may further include changing or moving the image in response to detecting that the angle of the foldable device is increasing.

The method may further include releasing the foldable device from the lock state and displaying a pre-set wallpaper in response to the angle of the foldable device being equal to or greater than the second angle.

The displaying of the wallpaper may include displaying a first mode wallpaper in response to the angle of the foldable device being within a first angle range, and displaying a second mode wallpaper in response to the angle of the foldable device being within a second angle range.

The method may further include performing user authentication by using biometric information of a user obtained through a biometric information recognizer, wherein the activating of the touch panel may include activating the touch panel in response to determining that the user authentication has succeeded.

The performing of the user authentication may include, in response to detecting an operation of unfolding the foldable device from a folded state, activating the biometric information recognizer and obtaining the biometric information.

The method may further include, in response to the angle of the foldable device being equal to or greater than the first angle, providing, on the display, an interface indicating that the user authentication is being performed.

The biometric information recognizer may include at least one of a fingerprint recognizing sensor and an iris recognizing camera.

According to an aspect of another exemplary embodiment, there is provided a flexible display device including: a display; a touch panel configured to detect a touch input; a sensing interface configured to detect an angle of the flexible display device; and a controller configured to, in response to determining that the angle of the flexible display device is greater than or equal to a first angle, activate the display, and in response to determining that the angle of the flexible display is greater than or equal to a second angle, activate the touch panel.

The second angle may be greater than the first angle.

The flexible device may further include a biometric information recognizer configured to receive biometric information from a user, and wherein the controller may be further configured to enter an unlock state in response to determining that the user is authorized.

The controller may be further configured to, in response to the detected angle being between the first angle and the second angle, display an image on the display indicating that the flexible display device is in a lock state.

The controller may be further configured to, in response to determining that the detected angle is increasing, move the image from a first position to a second position.

BRIEF DESCRIPTION OF THE DRAWINGS

These and/or other aspects will become apparent and more readily appreciated from the following description of the exemplary embodiments, taken in conjunction with the accompanying drawings in which:

FIGS. 9A and 9B are diagrams illustrating releasing a foldable device from a lock state according to an unfolding angle of the foldable device, according to an exemplary embodiment;

FIGS. 12 to 18 are diagrams illustrating user authentication using biometric information, according to one or more exemplary embodiments; and FIGS. 19 to 21 are diagrams illustrating a foldable device that is released from a lock state as the foldable device is unfolded, according to one or more exemplary embodiments.

DETAILED DESCRIPTION

Figure 1A:
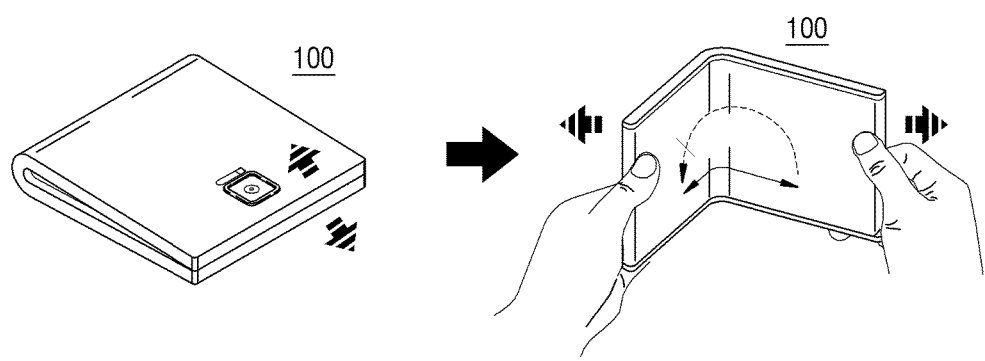
FIGS. 1A and 1B are conceptual diagrams illustrating one or more exemplary embodiments.

One or more exemplary embodiments will be described with reference to the accompanying drawings. However, the one or more exemplary embodiments may be embodied in many different forms, and should not be construed as being limited to the exemplary embodiments set forth herein. In the following description, well-known functions or constructions may not be described in detail if they would obscure the present disclosure with unnecessary detail. Like reference numerals in the drawings denote like or similar elements throughout the specification.

Advantages and features of one or more exemplary embodiments and methods of accomplishing the same may be understood with reference to the following detailed description of the exemplary embodiments and the accompanying drawings. Although the terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element.

Below, one or more exemplary embodiments will be described in detail with reference to accompanying drawings. Terms such as "module" or "unit" should be considered in a broad sense and are not limited to any particular meaning or role.

Examples of a device described herein may include a mobile phone, a smart phone, a tablet personal computer (PC), a laptop, a digital broadcasting terminal, a personal digital assistant (PDA), a portable multimedia player (PMP), and a navigation device, etc. However, configurations according to one or more exemplary embodiments may also be applied to a fixed terminal, such as a digital television (TV) or a desktop computer.

In the detailed description, if a region is "connected" to another region, the regions may be "directly connected," but may also be "electrically connected" via another device therebetween. Also, if a region "includes" an element, the region may further include other elements, unless stated otherwise.

As used herein, the term "and/or" includes any and all combinations of one or more of the associated listed items. Expressions such as "at least one of," when preceding a list of elements, modify the entire list of elements and do not modify the individual elements of the list.

Below, one or more exemplary embodiments will be described in detail with reference to accompanying drawings.

Figure 1B:
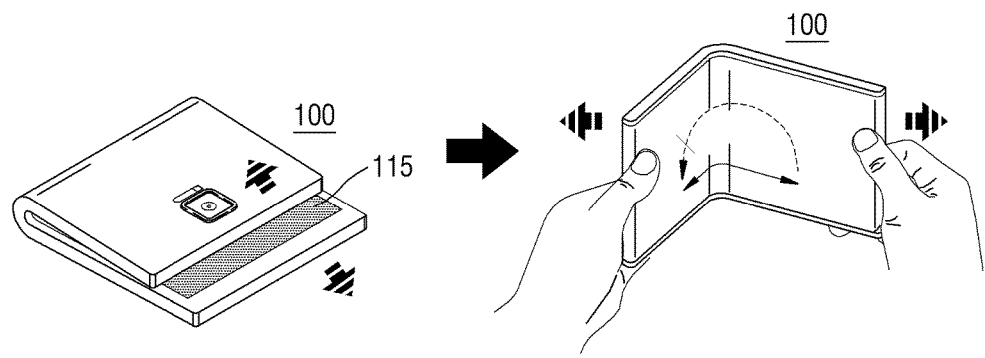

FIGS. 1A and 1B are conceptual diagrams illustrating one or more exemplary embodiments.

As shown in FIGS. 1A and 1B, according to an exemplary embodiment, a foldable device 100 may be released from a lock state when a user unfolds the foldable device 100.

According to an exemplary embodiment, the lock state of the foldable device 100 may denote a case in which a display unit 115 is in an inactivated state and a touch panel 117 is in an inactivated state. Also, the lock state may denote a case in which the display unit 115 is activated but the touch panel 117 is in an inactivated state.

According to an exemplary embodiment, when the foldable device 100 is in a lock state, the display unit 115 may be activated and display a screen, but because the touch panel 117 is in an inactivated state, a user input of touching the display unit 115 may not be detected.

For example, while a user unfolds the foldable device 100 in a folded state to use the foldable device 100, an image indicating the lock state may be displayed on the display unit 115. Also, because the touch panel 117 is in an inactivated state, a malfunction caused by an unintended touch input on the display unit 115 may be prevented.

An unlock state of the display unit 115 is a state in which the display unit 115 is released from the lock state. The unlock state may denote a state in which the display unit 115 is activated and the touch panel 117 is activated.

For example, when the foldable device 100 is in an unlock state, a pre-set wallpaper may be displayed on the display unit 115, and because the touch panel 117 is activated, the touch panel 117 may detect a user input of touching the display unit 115.

According to an exemplary embodiment, when the foldable device 100 is foldable, the foldable device 100 may provide a user interface (UI) through the display unit 115 when the foldable device 100 is unfolded. Accordingly, the user may unfold the foldable device 100 to use the foldable device 100.

According to an exemplary embodiment, a method of quickly and conveniently releasing display unit 115 from the lock state without having to perform a separate input (for example, a password input or a pattern input) to release the display unit 115 from the lock state after the user unfolds the foldable device 100 may be provided. In other words, when the user unfolds the foldable device 100 at least a predetermined angle, the foldable device 100 may determine that the display unit 115 is released from the lock state.

The foldable device 100 according to an exemplary embodiment may have a symmetrical shape, as shown in FIG. 1A, or an asymmetrical shape, as shown in FIG. 1B.

As shown in FIG. 1A, areas of two surfaces of the foldable device 100, which face each other while being folded, may be the same, and the two surfaces may be symmetrical such that the display unit 115 is not exposed when the foldable device 100 is folded.

Alternatively, as shown in FIG. 1B, the areas of the two surfaces of the foldable device 100 may not be the same and the two surfaces may be asymmetrical such that the display unit 115 provided inside is partially exposed when the foldable device 100 is folded.

Figure 2:
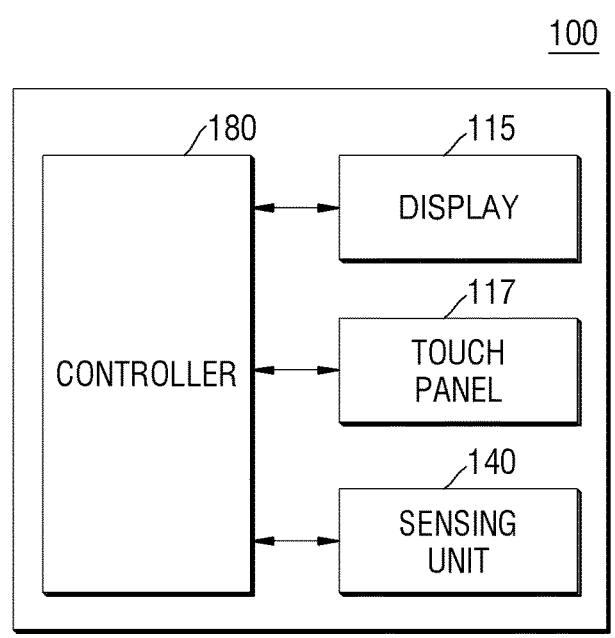
FIGS. 2 and 3 are block diagrams of a foldable device according to one or more exemplary embodiments.
Figure 3:
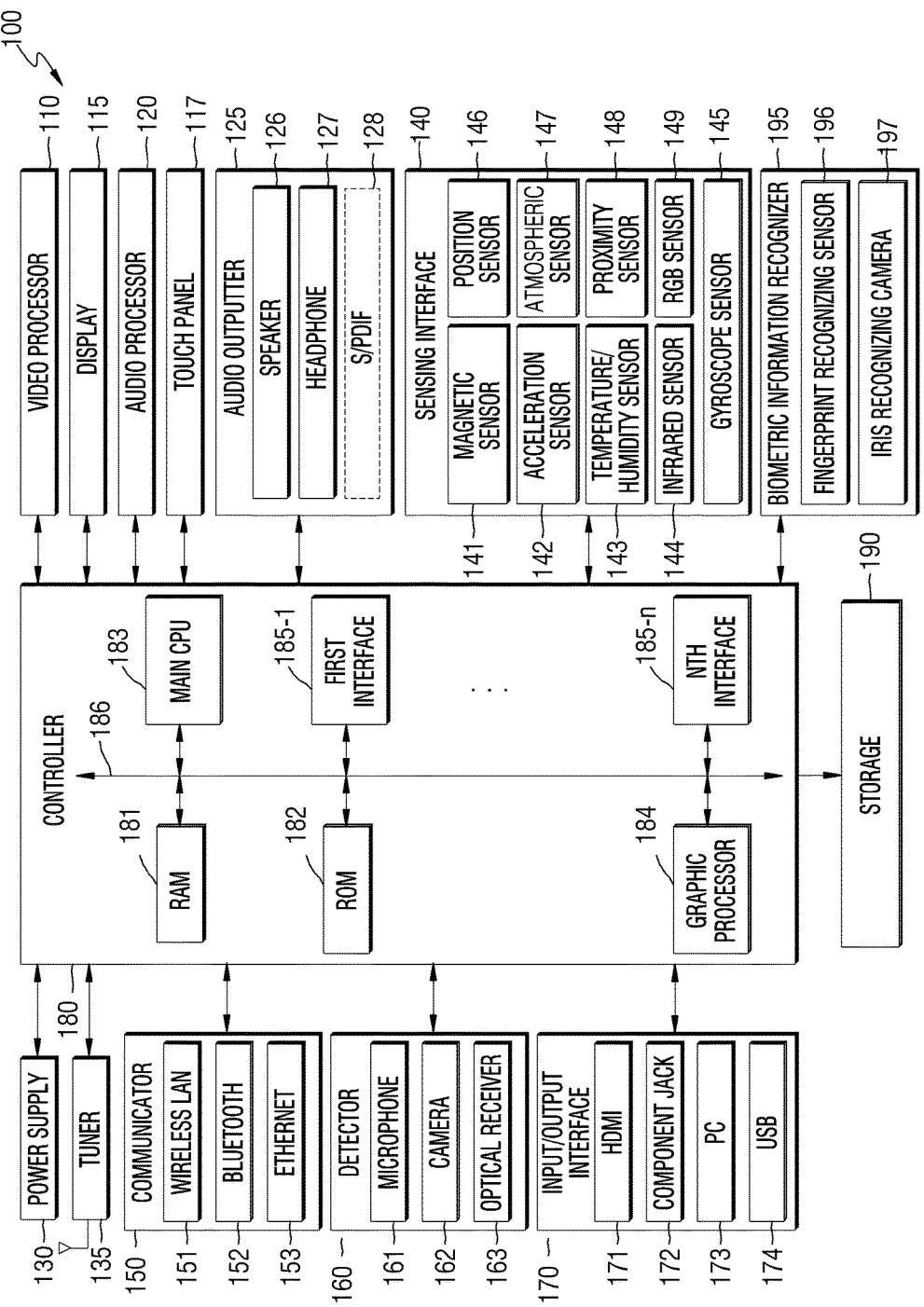

FIGS. 2 and 3 are block diagrams of a foldable device according to one or more exemplary embodiments.

Referring to FIG. 2, the foldable device 100 may include a sensing unit 140, the display unit 115, the touch panel 117, and a controller 180.

As shown in FIG. 3, the foldable device 100 may further include a video processor 110, an audio processor 120, an audio output unit 125 (e.g., audio outputter), a power supply 130, a tuner unit 135 (e.g., tuner), a communicator 150, a detector 160, an input/output unit 170 (e.g., input/output interface), a storage unit 190 (e.g., memory), and a biometric information recognizer 195.

The video processor 110 performs a process on video data received by the foldable device 100. The video processor 110 may perform various image processes on the video data, such as decoding, scaling, noise filtering, frame rate conversion, and resolution conversion, etc.

The display unit 115 may display, on a screen, a video included in a broadcasting signal received through the tuner 135, according to control of the controller 180. Also, the display unit 115 may display content (e.g., a video) input through the communicator 150 or the input/output unit 170. The display unit 115 may output an image stored in the storage unit 190 according to control of the controller 180. Also, the display unit 115 may display a voice UI (e.g., including a voice command guide) for performing a voice recognized task corresponding to voice recognition, or a motion UI (e.g., including a user motion guide for motion recognition) for performing a motion recognized task corresponding to motion recognition (e.g., gesture).

Examples of the display unit 115 include a liquid crystal display (LCD), a thin-film transistor-liquid crystal display (TFT-LCD), an organic light-emitting diode (OLED), an active-matrix organic light-emitting diode (AM-OLED), a plasma display panel (PDP), a flexible display, a 3-dimensional (3D) display, and an electrophoretic display, etc. Also, the display unit 115 may be transparent and/or wearable.

When the display unit 115 according to an exemplary embodiment is realized as a flexible display, the foldable device 100 may be realized to be foldable.

Also, according to an exemplary embodiment of the foldable device 100, the foldable device 100 may include at least two display units 115. The at least two display units 115 may face each other by using a hinge.

The display unit 115, according to an exemplary embodiment, may be activated according to control of the controller 180 when an unfolding angle detected by the sensing unit 140 (e.g., sensing interface) as the foldable device 100 is unfolded is equal to or greater than a first angle.

Also, the display unit 115 according to an exemplary embodiment may display an image indicating that the foldable device 100 is in the lock state when the unfolding angle of the foldable device 100 is equal to or greater than the first angle, according to control of the controller 180.

According to an exemplary embodiment, the display unit 115 may change or move the image when it is detected that the unfolding angle of the foldable device 100 increases, according to control of the controller 180.

According to an exemplary embodiment, the display unit 115 may release the foldable device 100 from the lock state and display a pre-set or predetermined wallpaper when the unfolding angle of the foldable device 100 is equal to or greater than a second angle, according to control of the controller 180.

The display unit 115 according to an exemplary embodiment may display a first mode wallpaper when the unfolding angle of the foldable device 100 is within a first angle range, and display a second mode wallpaper when the unfolding angle of the foldable device 100 is within a second angle range, according to control of the controller 180.

According to an exemplary embodiment, the display unit 115 may display an interface indicating that user authentication is being performed, according to control of the controller 180.

When the display unit 115 and the touch panel 117 are configured as a touch screen by forming a layer structure, the display unit 115 may be used as an output device and an input device.

The touch panel 117 may be configured to convert a change of pressure or capacitance generated in a region of the display unit 115 to an electric input signal. The touch panel 117 may be configured to detect a touch location, a touch area, and a touch pressure.

When the touch panel 117 receives a touch input, a signal corresponding to the touch input is transmitted to a touch controller. The touch controller processes the signal, and transmits data obtained by processing the signal to the controller 180. Accordingly, the controller 180 determines which region of the display unit 115 is touched. The touch panel 117, according to an exemplary embodiment, may be activated when the unfolding angle detected by the sensing unit 140 is equal to or greater than the second angle, according to control of the controller 180. The touch panel 117, according to an exemplary embodiment, may be activated when it is determined that user authentication using biometric information of the user, which is obtained by the biometric information recognizer 195, has succeeded, according to control of the controller 180.

The audio processor 120 performs a process on audio data. The audio processor 120 may perform various processes on the audio data, such as decoding, amplification, and noise filtering, etc. The audio processor 120 may include a plurality of audio processing modules to process audio corresponding to a plurality of pieces of content.

The audio output unit 125 (e.g., audio outputter) outputs audio included in a broadcasting signal received through the sensing unit 140, according to control of the controller 180. The audio output unit 125 may output audio (e.g., voice or sound) input through the communicator 150 or the input/output unit 170. Also, the audio output unit 125 may output audio stored in the storage unit 190, according to control of the controller 180. The audio output unit 125 may include at least one of a speaker 126, a headphone output terminal 127, and a Sony/Philips Digital interface (S/PDIF) output terminal 128. The audio output unit 125 may include any combination of the speaker 126, the headphone output terminal 127, and the S/PDIF output terminal 128.

The power supply unit 130 supplies power from an external power source to the elements included in the foldable device 100, according to control of the controller 180. Also, the power supply unit 130 may supply power output from at least one battery provided inside the foldable device 100 to the elements included in the foldable device 100, according to control of the controller 180.

The tuner unit 135 may tune and select a frequency of a channel to be received by the foldable device 100 from among radio wave components of a wired or wireless broadcasting signal via amplification, mixing, and resonance. A broadcasting signal includes audio, video, and additional information (e.g., an electronic program guide (EPG)).

The tuner unit 135 may receive a broadcasting signal in a frequency band corresponding to a channel number (e.g., a cable channel number 506) according to a user input (e.g., a control signal received from a control device, such as a channel number input, a channel up-down input, or a channel input in an EPG screen).

The tuner unit 135 may receive a broadcasting signal from any one of various sources, such as terrestrial broadcasting, cable broadcasting, satellite broadcasting, and internet broadcasting, etc. The tuner unit 125 may receive a broadcasting signal from a source such as analog broadcasting or digital broadcasting. A broadcasting signal received through the tuner unit 135 may be decoded (e.g., audio decoding, video decoding or additional information decoding), and separated into audio, video, and/or additional information. The audio, the video, and/or the additional information may be stored in the storage unit 190 according to control of the controller 180.

The foldable device 100 may include at least one tuner unit 135. The tuner unit 135 may be realized as an all-in-one component of the foldable device 100, or realized as a separate device electrically connected to the foldable device 100 (e.g., a tuner unit connected to a set-top box and the input/output unit 170).

The sensing unit 140 may detect a state of the foldable device 100 or a state around the foldable device 100, and transmit the detected state to the controller 130.

The sensing unit 140 may include at least one of a magnetic sensor 141, an acceleration sensor 142, a hall sensor, a bending sensor, a temperature/humidity sensor 143, an infrared sensor 144, a gyroscope sensor 145, a location sensor 146 (e.g., a global positioning system (GPS)), an atmospheric sensor 147, a proximity sensor 148, and an RGB sensor 149 (e.g., illuminance sensor), but it is not limited thereto.

Also, the sensing unit 140 may include a sensor for detecting a touch input of an input tool (e.g., stylus), and a sensor for detecting a touch input of the user. The sensor for detecting a touch input of the user may be included in a touch screen or a touch pad. The sensor for detecting a touch input of the input tool may be provided below or inside the touch screen or the touch pad.

According to an exemplary embodiment, the sensing unit 140 may detect an operation in which the foldable device 100 is unfolded or folded. According to an exemplary embodiment, the sensing unit 140 may detect an operation in which the foldable device 100 is changed from a folded state to an unfolded state, or from an unfolded state to a folded state. For example, the hall sensor or the magnetic sensor 141 provided at a folding region may detect the operation in which the foldable device 100 is folded or unfolded.

According to another exemplary embodiment, the sensing unit 140 may detect whether a current state of the foldable device 100 is in a folded state or an unfolded state, and when the current state is changed, detect a folding or unfolding operation.

According to an exemplary embodiment, the sensing unit 140 may be provided at a location where the two surfaces of the foldable device 100 approach each other through folding, thereby detecting the folded state.

Also, the sensing unit 140 may detect the unfolding angle of the foldable device 100. For example, when the foldable device 100 has a hinge structure, an angle between the two surfaces that are unfolded may be measured based on the hinge structure.

According to an exemplary embodiment, the sensing unit 140 may determine the folded state or the unfolded state and provide a result of the determining to the controller 180. Also, the sensing unit 140 may provide information about the unfolding angle of the foldable device 100 to the controller 180.

The communicator 150 may connect an external device (e.g., an audio device) to the foldable device 100 according to control of the controller 180. The controller 180 may transmit/receive content to/from the external device, download an application from the external device, and/or browse the Internet.

The communicator 150 may include at least one of a wireless local area network (LAN) 151, Bluetooth 152, and wired Ethernet 153, based on performance and a structure of the foldable device 100. The communicator 150 may include any combination of the wireless LAN 151, the Bluetooth 152, and the wired Ethernet 153.

The communicator 150 may include a Bluetooth low energy (BLE) communicator, a near field communication unit, a WLAN (Wi-Fi) communicator, a Zigbee communicator, an infrared data association (IrDA) communicator, a Wi-Fi direct (WFD) communicator, an ultra wideband (UWB) communicator, and an Ant+ communicator, but is not limited thereto.

The communicator 150 may transmit and receive a wireless signal to and from at least one of a base station, an external terminal, and a server on a mobile communication network. A wireless signal may include various types of data according to transmission and reception of a voice call signal, an image call signal, and/or a text/multimedia message.

The communicator 150 may include a broadcasting receiver that receives an external broadcasting signal and/or broadcasting related information through a broadcasting channel. Non-limiting examples of the broadcasting channel include a satellite channel and a terrestrial channel.

The communicator 150 may receive a control signal of an external control device according to control of the controller 180. The control signal may be a Bluetooth type, a radio frequency (RF) signal type, and/or a Wi-Fi type.

The detector 160 may detect voice of the user, an image of the user, or an interaction of the user.

A microphone 161 receives a voice uttered by the user. The microphone 161 converts the voice to an electric signal and outputs the electric signal to the controller 180. The voice may include, for example, a voice corresponding to a menu or a function of the foldable device 100. The microphone 161 may have a recognition range (e.g., 4 m) from the microphone 161 to a location of the user, and may vary according to the volume of the voice and an ambient environment (e.g., a speaker sound and ambient noise).

The microphone 161 may be embedded in or separated from the foldable device 100. When the microphone 161 is separated from the foldable device 100, the microphone 161 may be electrically connected to the foldable device 100 through the communicator 150 and/or the input/output unit 170.

A camera 162 may include a lens and an image sensor. The camera 162 may support optical zoom or digital zoom by using a plurality of lenses and image processing. A recognition range of the camera 162 may be variously set according to an angle of a camera and an ambient environment condition. When the camera 162 includes a plurality of cameras, the camera unit 162 may receive a 3D still image or a 3D motion by using the plurality of cameras.

The camera 162 may be embedded in or separated from the foldable device 100. When the camera 162 is separated from the foldable device 100, the camera 162 may be electrically connected to the foldable device 100 through the communicator 150 or the input/output unit 170.

According to an exemplary embodiment, the camera 162 may include an iris recognizing camera.

According to an exemplary embodiment, an optical receiver 163 receives an optical signal (including a control signal) from an external control device through an optical window of a bezel of the display unit 115. The optical receiver 163 may receive an optical signal corresponding to a user input (e.g., touching, pressing, a touch gesture, voice, or motion) from the external control device. A control signal may be extracted from the optical signal according to control of the controller 180.

The input/output unit 170 receives video (e.g., a moving image), audio (e.g., voice or music), and additional information (e.g., EPG), from an external source of the foldable device 100, according to control of the controller 180. The input/output unit 170 may include at least one of a high-definition multimedia interface (HDMI) port 171, a component jack 172, a personal computer (PC) port 173, and a universal serial bus (USB) port 174. The input/output unit 170 may include any combination of the HDMI port 171, the component jack 172, the PC port 173, and the USB port 174.

A structure and operations of the input/output unit 170 may vary according to exemplary embodiments.

The controller 180 controls overall operations of the foldable device 100 and signal flows between the elements of the foldable device 100, and processes data. The controller 180 may execute an operation system (OS) or various applications stored in the storage unit 190 when a user input is received or a pre-set stored condition is satisfied.

The controller 180 may include a random access memory (RAM) 181 that is used as a storage space for storing external signals or data or corresponding to various operations performed by the foldable device 100, a read-only memory (ROM) 182 in which a control program for controlling the foldable device 100 is stored, and a processor 183 (e.g., main CPU).

The processor 183 may include a graphic processing unit (GPU) for performing a graphics process corresponding to a video. The processor 183 may be realized as a system-on-chip (SoC) including a core and the GPU. The processor 183 may include a single core, a dual core, a triple core, a quad core, or any plurality of cores.

Also, the processor 183 may include a plurality of processors. For example, the processor 183 may include a main processor and a sub-processor that operates in a sleep mode.

A graphics processor 184 generates a screen including various objects, such as an icon, an image, and text, by using a calculator and a rendering unit, etc. The calculator calculates an attribute value, such as a coordinate value, a shape, a size, or color, of each object to be displayed according to a layout of a screen, by using a user interaction detected by the detector 160. The rendering unit generates a screen of various layouts including objects based on the attribute value calculated by the calculator. The screen generated by the rendering unit is displayed in a display region of the display unit 115.

First through n-th interfaces, 185-1 through 185-n, are connected to the elements described above. One of the first through n-th interfaces 185-1 through 185-n may be a network interface connected to an external device through a network.

The RAM 181, the ROM 182, the processor 183, the graphic processor 184, and the first through n-th interfaces 185-1 through 185-n may be mutually connected to each other through an internal bus 186.

According to an exemplary embodiment, the "controller" may include the processor 183, the ROM 182, and the RAM 181.

According to an exemplary embodiment, the controller 180 of the foldable device 100 may activate the display unit 115 when the unfolding angle detected by the sensing unit 140 as the unfolding device 100 is unfolded is equal to or greater than a first angle, and activate the touch panel 117 when the unfolding angle detected by the sensing unit 140 is equal to or greater than a second angle.

The controller 180 of the foldable device 100 according to an exemplary embodiment may display, on the display unit 115, the image indicating that the foldable device 100 is in the lock state, when the unfolding angle of the foldable device 100 is equal to or greater than the first angle.

Also, the controller 180 according to an exemplary embodiment may change or move the image when it is detected that the unfolding angle of the foldable device 100 increases.

According to an exemplary embodiment, the controller 180 may release the display unit 115 from the lock state and display, on the display unit 115, the pre-set wallpaper when the unfolding angle of the foldable device 100 is equal to or greater than the second angle.

The controller 180 may display the first mode wallpaper when the unfolding angle of the foldable device 100 is within the first angle range, and display the second mode wallpaper when the unfolding angle of the foldable device 100 is within the second angle range.

The controller 180 according to an exemplary embodiment may perform user authentication by using the biometric information of the user, which is obtained through the biometric information recognizer 195.

According to an exemplary embodiment, the controller 180 may activate the biometric information recognizer 195 and obtain the biometric information when an operation the foldable device 100 is unfolded is detected through the sensing unit 140.

According to an exemplary embodiment, the controller 180 may activate the touch panel 117 when it is determined that the user authentication has succeeded.

According to an exemplary embodiment, the controller 180 may provide, to the display unit 115, an interface indicating that the user authentication is being performed.

A structure and operations of the controller 180 may vary according to exemplary embodiments.

The storage unit 190 may store various types of data, programs, and/or applications for driving and controlling the foldable device 100 according to control of the controller 180. The storage unit 190 may store input/output signal and/or data according to operations of the video processor 110, the display unit 115, the audio processor 120, the audio output unit 125, the power supply unit 130, the tuner unit 135, the communicator 150, the detector 160, and the input/output unit 170. The storage unit 190 may store control programs for controls of the foldable device 100 and the controller 180, applications initially provided by a manufacturer or downloaded from an external source, a GUI related to an application, an object for providing a GUI (for example, an image, text, an icon, or a button), user information, a document, databases, and/or related data.

According to an exemplary embodiment, the "storage unit" includes the storage unit 190, the ROM 182, the RAM 181, and/or a memory card (e.g., a micro security digital (SD) card or a USB memory) provided in the foldable device 100. The storage unit 190 may include a nonvolatile memory, a volatile memory, a hard disk drive (HDD), or a solid state drive (SSD).

The storage unit 190 may include a broadcast receiving module, a channel control module, a volume control module, a communication control module, a voice recognizing module, a motion recognizing module, an optical receiving module, a display control module, an audio control module, an external input control module, a power control module, a power control module of an external device connected wirelessly (for example, via Bluetooth), a voice database (DB), and/or a motion DB. A module or a DB of the storage unit 190 may be realized in a form of software to perform, in the foldable device 100, a broadcasting receiving control function, a channel control function, a volume control function, a communication control function, a voice recognizing function, a motion recognizing function, an optical receiving control function, a display control function, an audio control function, an external input control function, a power control function, and/or a power control function of an external device connected wirelessly (for example, via Bluetooth). The controller 180 may perform a function by using the software stored in the storage unit 190.

The biometric information recognizer 195 may include a fingerprint recognizing sensor 196 and an iris recognizing camera 197, but is not limited thereto. The biometric information recognizer 195 may include a voice recognizing sensor, a face recognizing sensor, a palm line recognizing sensor, a vein distribution recognizing sensor, a retina recognizing sensor, a movement pattern recognizing sensor, such as a walking style recognizing sensor, an electrocardiogram (ECG) recognizing sensor, and/or a palm print recognizing sensor.

According to an exemplary embodiment, the biometric information recognizer 195 may recognize fingerprint information or iris information of the user according to control of the controller 180, and transmit the fingerprint information or the iris information to the controller 180.

More or less elements than the elements shown in FIG. 3 may be included in the foldable device 100, according to performance of the foldable device 100. Locations of the elements may change according to performance or a structure of the foldable device 100.

Figure 4:
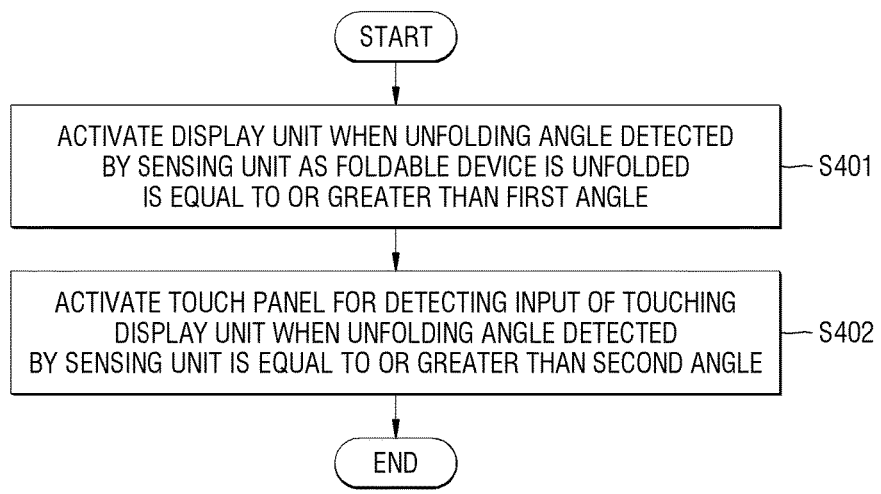
FIGS. 4 and 5 are flowcharts of a method of controlling a foldable device, according to one or more exemplary embodiments.
Figure 5:
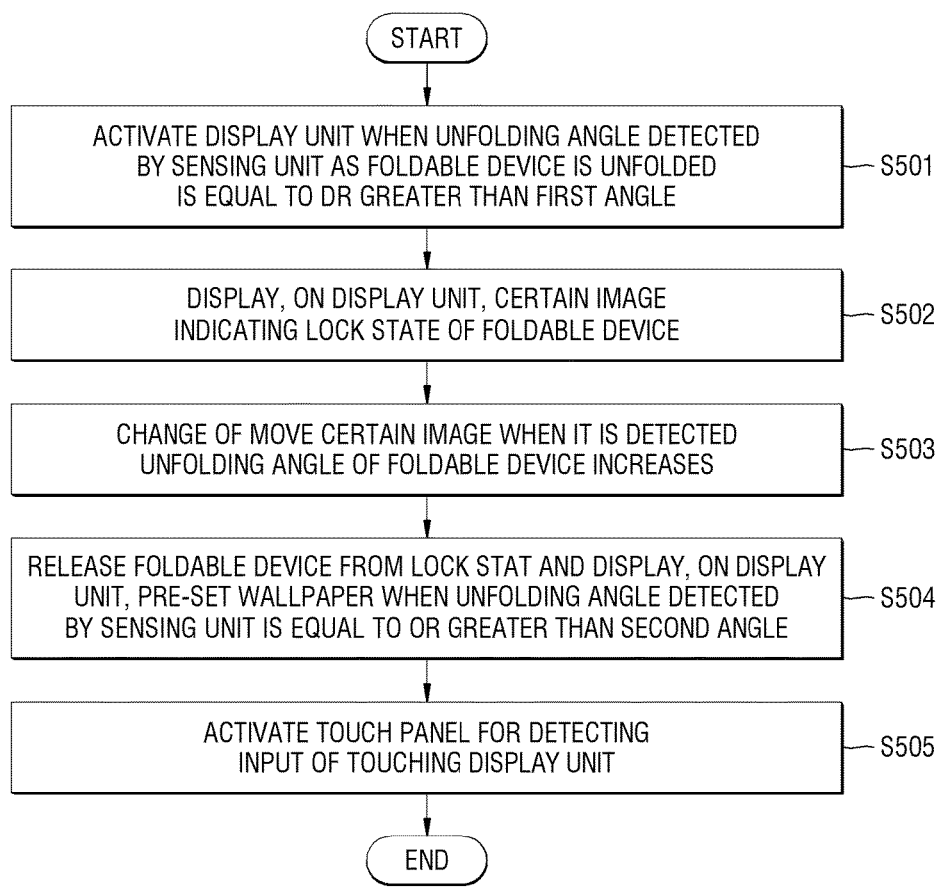

FIGS. 4 and 5 are flowcharts of a method of controlling the foldable device 100, according to one or more exemplary embodiments.

In operation S401 of FIG. 4, when the foldable device 100 is unfolded, the controller 180 may activate the display unit 115 when the unfolding angle detected by the sensing unit 140 is equal to or greater than a first angle.

For example, when the foldable device 100 is unfolded from a folded state to at least a first angle (e.g., 20°), the display unit 115 may be activated. At this time, the foldable device 100 is in a lock state, and the image indicating the lock state may be displayed on the display unit 115.

In operation S402 of FIG. 4, the controller 180 may activate the touch panel 117 for detecting an input of touching the display unit 115 when the unfolding angle of the foldable device 100 detected by the sensing unit 140 is equal to or greater than a second angle.

For example, when the foldable device 100 is unfolded to at least a second angle (e.g., 160°), the controller 180 may display the pre-set wallpaper on the display unit 115. When the touch panel 117 is activated, for example, a touch input of selecting an application displayed on the pre-set wallpaper may be detected. This may mean that the foldable device 100 according to an exemplary embodiment is in the unlock state as the foldable device 100 is unfolded at least the second angle.

According to an exemplary embodiment, the first and second angles may be set when the foldable device 100 is manufactured, or may be set or changed by the user, but are not limited thereto.

The lock state may be realized after user authentication (e.g., biometric information recognition) for security of the foldable device 100, as will be described later with reference to FIGS. 11 to 22.

Figure 6:
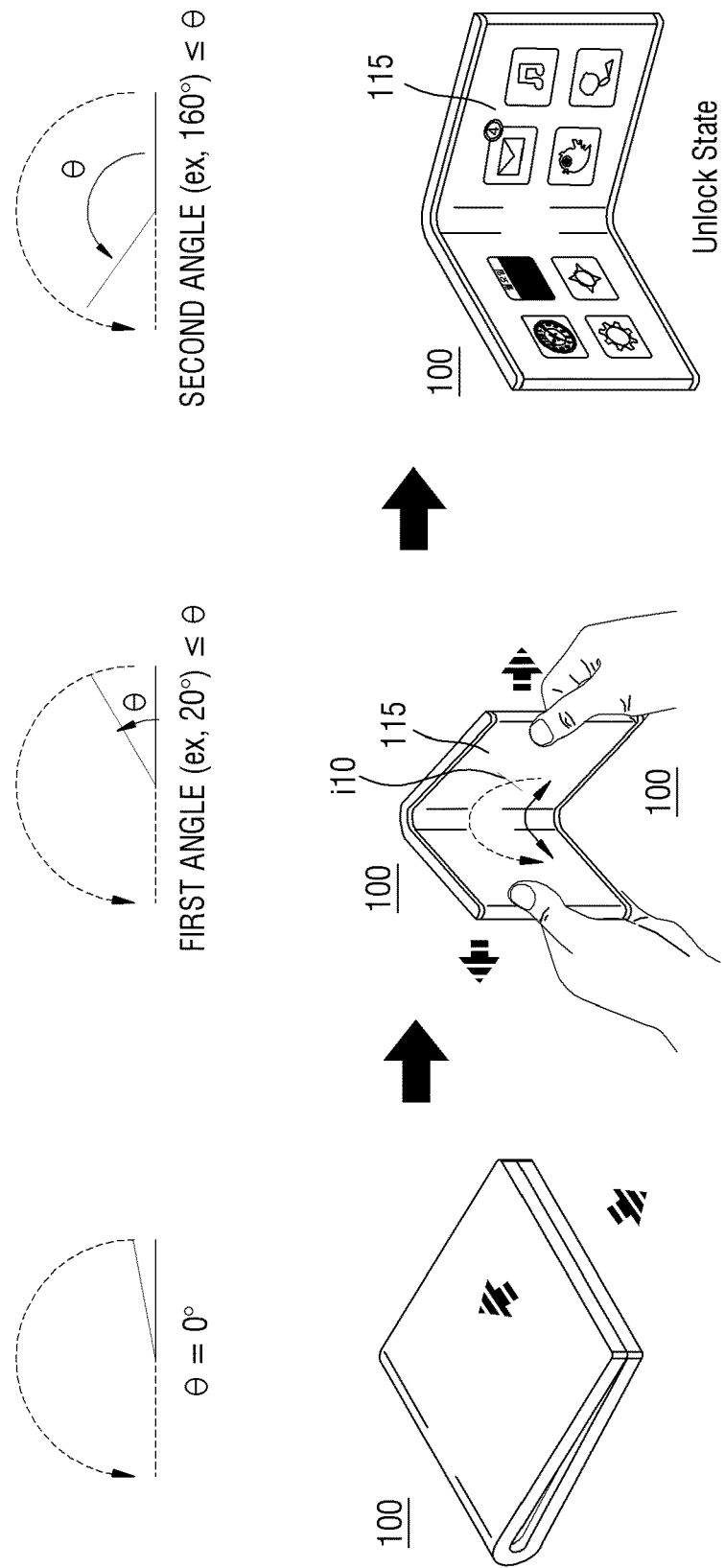
FIG. 6 is a diagram illustrating a method of releasing a foldable device from a lock state, according to an exemplary embodiment.
Figure 7:
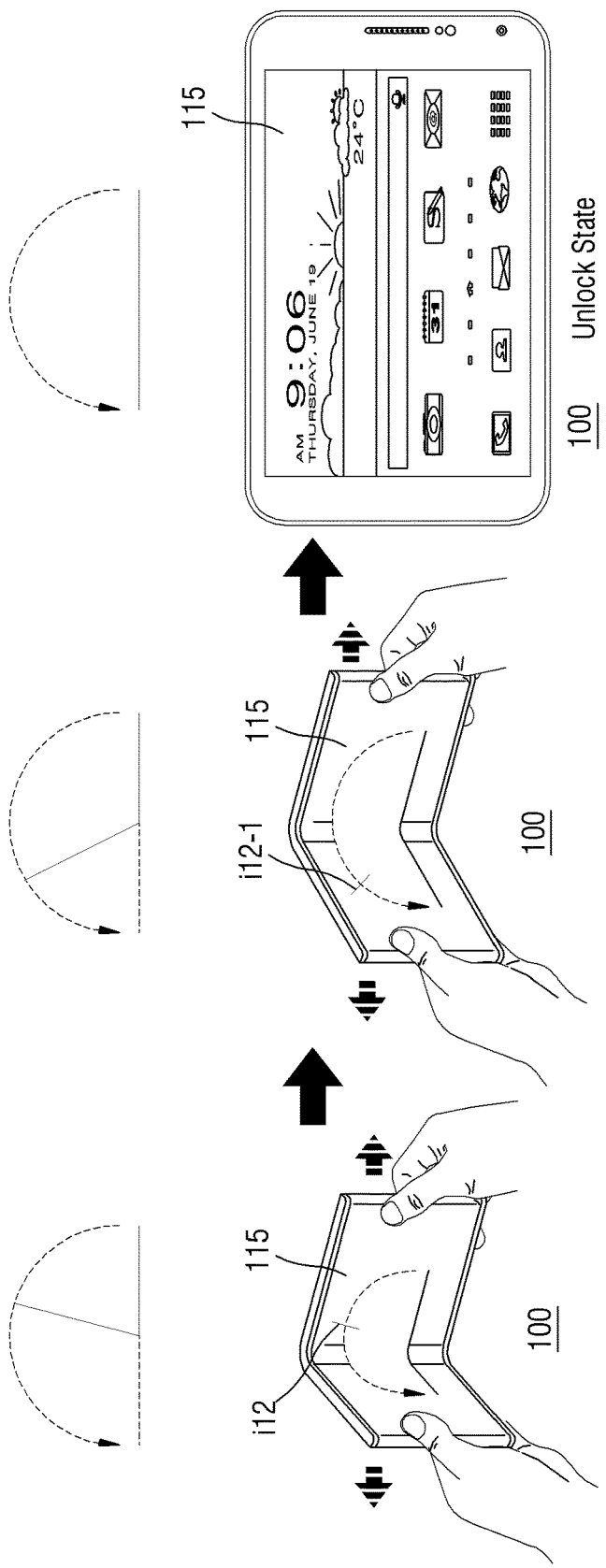
FIG. 7 is a diagram illustrating an interface in which a foldable device is released from a lock state as the foldable device is unfolded, according to one or more exemplary embodiments.
Figure 8:
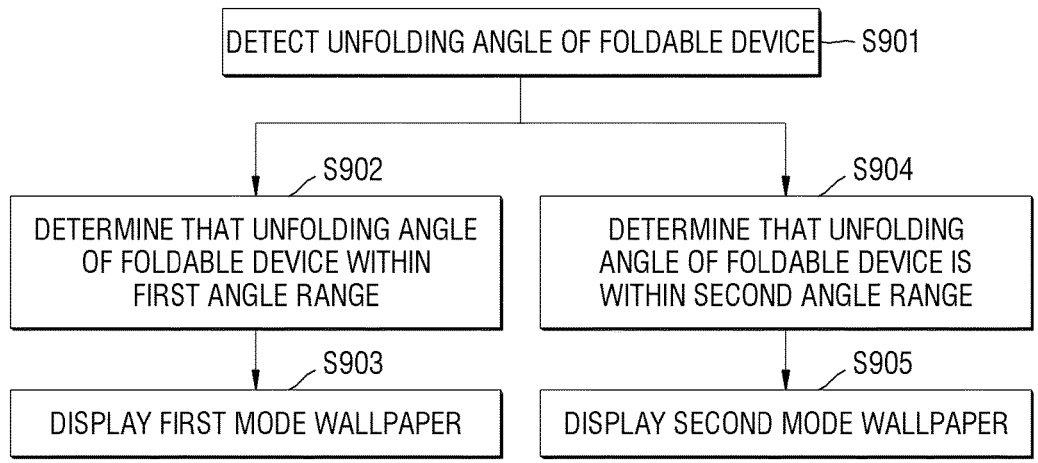
FIG. 8 is a flowchart illustrating releasing a foldable device from a lock state according to an unfolding angle of the foldable device, according to an exemplary embodiment.

FIG. 5 is a flowchart for describing a UI when the display unit 115 is changed from the lock state to the unlock state. FIG. 6 illustrates a method of releasing the foldable device 100 from the lock state, according to an exemplary embodiment. FIGS. 7 and 8 are diagrams illustrating an interface in which the foldable device 100 is released from the lock state as the foldable device 100 is unfolded, according to one or exemplary embodiments.

The flowchart of FIG. 5 will be described with reference to FIGS. 6 to 8.

In operation S501 of FIG. 5, the display unit 115 may be activated when the unfolding angle detected by the sensing unit 140 as the foldable device 100 is unfolded is equal to or greater than the first angle. In operation S502, the foldable device 100 may display the image indicating the lock state, on the display unit 115.

Referring to FIG. 6, the controller 180 when the foldable device 100 in the folded state is unfolded at least the first angle (e.g., 20°), the controller 180 may activate the display unit 115 and provide an interface for indicating the lock state. For example, as shown in the center diagram of FIG. 6, an oval may be displayed and a icon i10 moving on the oval may be displayed.

In operation S503 of FIG. 5, when it is detected that the unfolding angle of the foldable device 100 increases, the controller 180 may change or move the image indicating the lock state.

For example, referring to FIG. 7, when the unfolding angle of the foldable device 100 increases, the foldable device 100 may move the icon i12 to the left to display an icon i12-1.

According to an exemplary embodiment, the user may intuitively recognize that the foldable device 100 is released from the lock state when the foldable device 100 is unfolded until an icon moving according to the unfolding angle reaches an end of the oval (e.g., center diagram of FIG. 7).

In operation S504 of FIG. 5, when the unfolding angle of the foldable device 100 detected by the sensing unit 140 is equal to or greater than the second angle, the controller 180 may release the foldable device 100 from the lock state and display the pre-set wallpaper on the display unit 115. Here, the controller 180 may activate the touch panel 117 for detecting an input of touching the display unit 115 in operation S505.

For example, as shown at the right side of FIG. 6, the controller 180 may display, on the display unit 115, the pre-set wallpaper when the foldable device 100 is unfolded to at least a second angle (e.g., 160°), and detect the input of touching the display unit 115. The foldable device 100 may be released from the lock state when the foldable device 100 is unfolded at least the second angle.

FIG. 8 is a flowchart illustrating releasing the foldable device 100 from the lock state according to the unfolding angle of the foldable device 100, according to an exemplary embodiment. FIGS. 9A and 9B are diagrams illustrating releasing the foldable device 100 from the lock state according to the unfolding angle of the foldable device 100, according to an exemplary embodiment. The flowchart of FIG. 8 will be described with reference to FIGS. 9A and 9B.

According to an exemplary embodiment, when the foldable device 100 is released from the lock state as the foldable device 100 is unfolded to at least a predetermined angle, the foldable device 100 may provide different service environments according to an unfolding angle range.

For example, when the unfolding angle range is from 80° to 100°, the foldable device 100 may execute a laptop mode, and when the unfolding angle range is from 150° to 180°, the foldable device 100 may execute a tablet mode. The device 100 may provide different wallpapers in the laptop mode and the tablet mode. For example, applications may be gathered to form a wallpaper in each of the laptop mode and the tablet mode. Also, different background images may be set for each mode. The wallpaper or the background image may be set when the foldable device 100 is manufactured, or may be initially set or changed by the user, but are not limited thereto.

As another example, different OSs may be driven in each mode according to the unfolding angle of the foldable device 100. For example, when the unfolding angle range is from 80° to 100°, Windows may be driven, and when the unfolding angle range is from 150° to 180°, Android may be driven. Exemplary embodiments are not limited to these.

Referring to FIG. 8, in operation S901, the controller 180 of the foldable device 100 may detect the unfolding angle of the foldable device 100 through the sensing unit 140.

In operation S902 of FIG. 8, the controller 180 of the foldable device 100 may determine that the unfolding angle of the foldable device 100 is within the first angle range. In operation S903, the controller 180 may display, on the display unit 115, the first mode wallpaper.

For example, as shown in FIG. 9A, while the unfolding angle of the foldable device 100 is within a first angle range (e.g., from 100° to less than 130°), the controller 180 may display, on the display unit 115, an icon i15 to move up to a location corresponding to the first angle range. Also, as shown in FIG. 9A, when the foldable device 100 is unfolded in the first angle range, the controller 180 may display, on the display unit 115, the first mode wallpaper, for example, a wallpaper in the laptop mode.

In operation S904 of FIG. 8, the controller 180 of the foldable device 100 may determine that the unfolding angle of the foldable device 100 is within a second angle range. In operation S905, the controller 180 may display, on the display unit 115, the second mode wallpaper.

For example, as shown in FIG. 9B, while the unfolding angle of the foldable device 100 is within the second angle range (e.g., from 130° to 180°), the controller 180 may display, on the display unit 115, an icon i15-1 to move up to a location corresponding to the second angle range. Also, as shown in FIG. 9B, when the foldable device 100 is unfolded in the second angle range, the controller 180 may display, on the display unit 115, the second mode wallpaper, for example, a wallpaper in the tablet mode.

According to an exemplary embodiment, the foldable device 100 determines the unfolding angle range to selectively execute one of a plurality of different modes (e.g., the laptop mode and the tablet mode), but is not limited thereto.

According to an exemplary embodiment, the foldable device 100 may execute the laptop mode when the unfolding angle is within the first angle range, and execute the tablet mode when the unfolding angle is within the second angle range.

Figure 10:
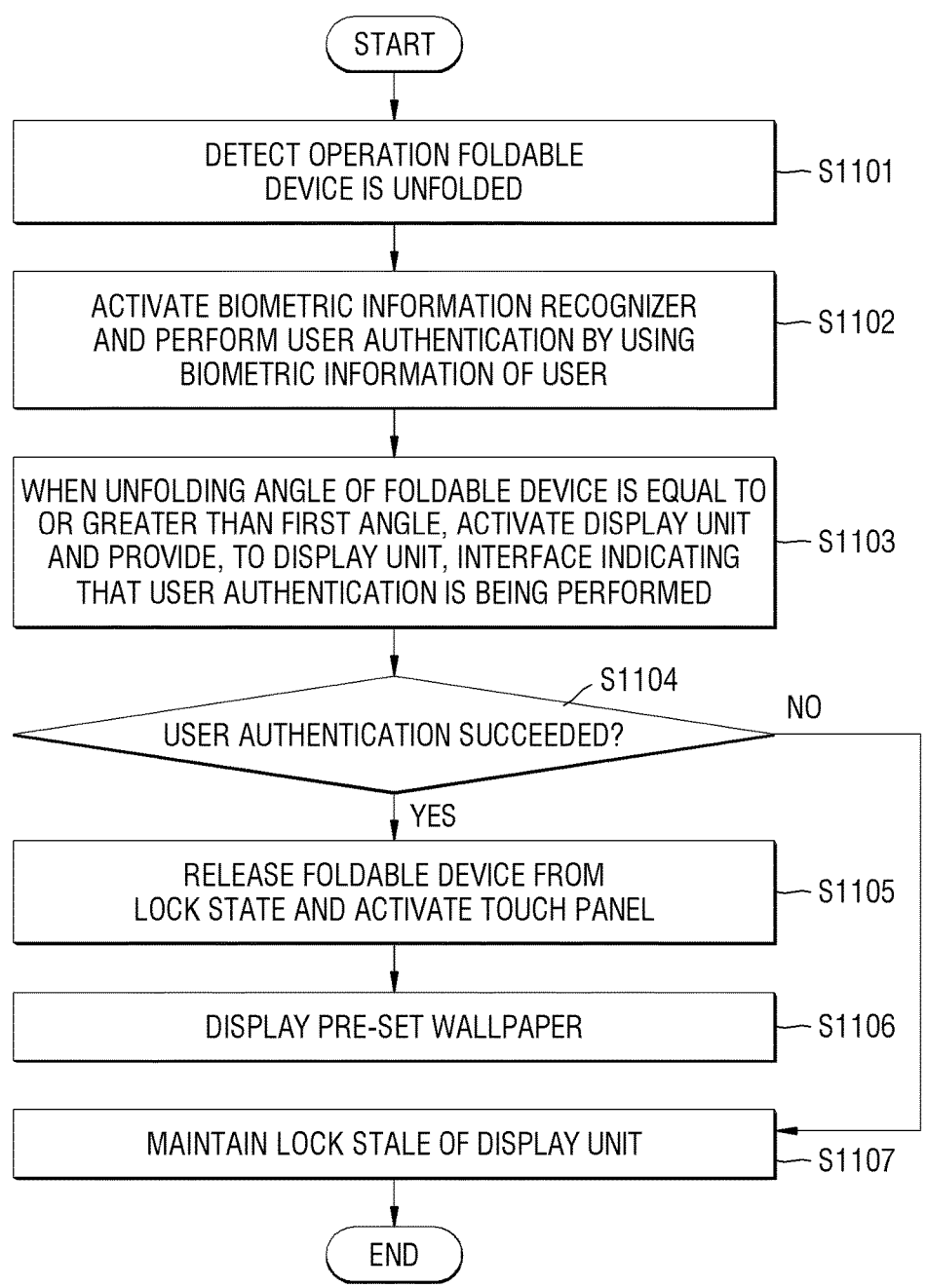
FIG. 10 is a flowchart illustrating user authentication using biometric information, according to an exemplary embodiment.

FIG. 10 is a flowchart illustrating user authentication using biometric information, according to an exemplary embodiment.

The foldable device 100, according to an exemplary embodiment, may release the foldable device 100 from the lock state by performing the user authentication while the foldable device 100 is unfolded. The foldable device 100 may use the biometric information (e.g., fingerprint information or iris information) of the user for the user authentication. The biometric information recognizer 195 for obtaining the biometric information may be performed while recognizing an unfolding operation of the foldable device 100. Accordingly, the user may recognize that the user authentication is performed while an operation the foldable device 100 is unfolded is performed.

The biometric information is not limited to the fingerprint information and the iris information, and may include voice information, face information, palm line information, vein distribution information, retina information, movement pattern information, such as walking style information, ECG information, and/or palm print information.

In operation S1101 of FIG. 10, the controller 180 of the foldable device 100 may detect an operation in which the foldable device 100 is unfolded through the sensing unit 140. In operation S1102, the foldable device 100 may activate the biometric information recognizer 195, and perform the user authentication by using the biometric information obtained by the biometric information recognizer 195.

According to an exemplary embodiment, the controller 180 may perform the user authentication by comparing pre-stored fingerprint information and/or pre-stored iris information according to user identification (ID) information and currently obtained fingerprint information and/or currently obtained iris information.

In operation S1103 of FIG. 10, when the unfolding angle of the foldable device 100 is at least the first angle, the display unit 115 is activated and an interface indicating that the user authentication is being performed may be displayed on the display unit 115.

Figure 12:
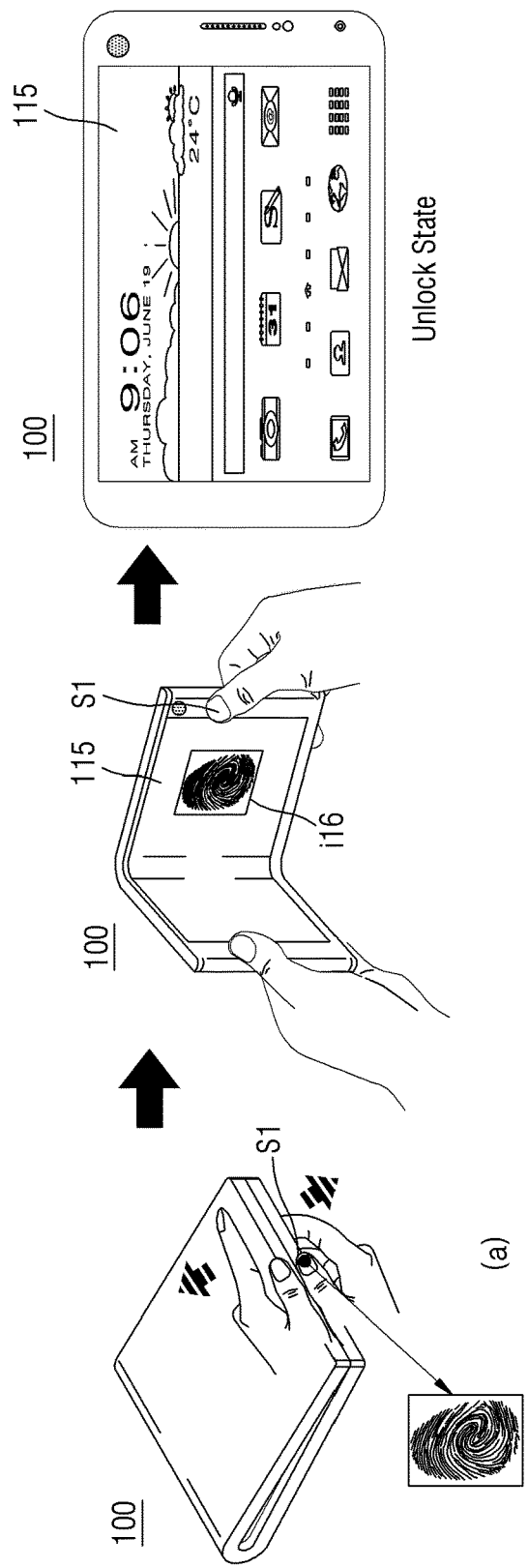

For example, as shown in FIG. 12, when fingerprint authentication is being performed, a fingerprint image i16 may be displayed and move on the display unit 115 until fingerprint recognition is completed.

Figure 13:
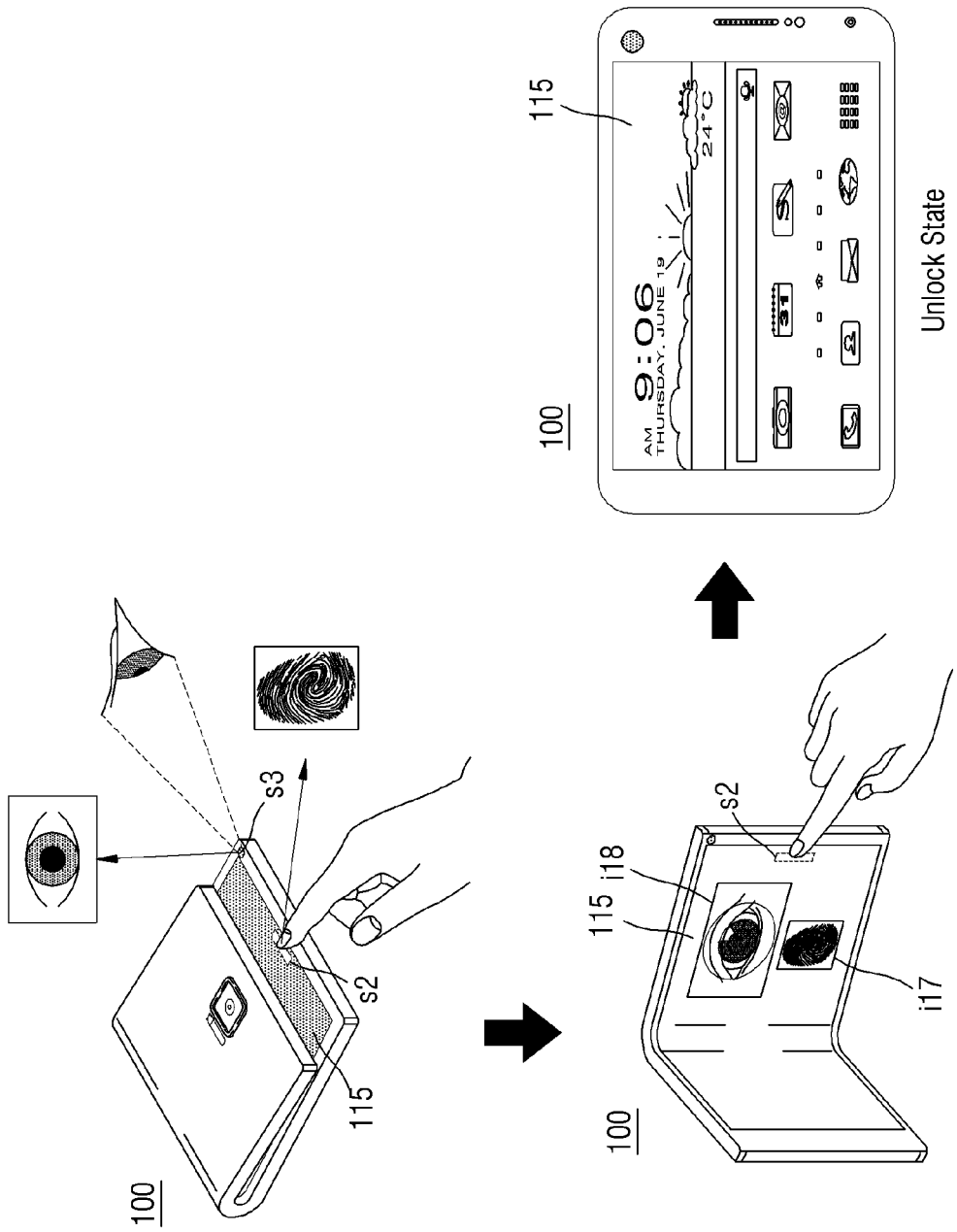

Also, as shown in FIG. 13, when fingerprint authentication and iris authentication are performed, a fingerprint image i17 and an iris image i18 may be displayed on the display unit 115. The controller 180 may display the fingerprint image i17 and the iris image i18 as moving images until the fingerprint authentication and the iris authentication are completed.

In operation S1104 of FIG. 10, the controller 180 of the foldable device 100 may determine whether the user authentication has succeeded. When it is determined that the user authentication has succeeded, the controller 180 may release the display unit 115 from the lock state and activate the touch panel 117 in operation S1105. In operation S1106, the controller 180 may display the pre-set wallpaper on the display unit 115.

For example, as shown in FIG. 12, a wallpaper pre-set to be displayed in the unlock state may be displayed on the display unit 115.

When it is determined that the user authentication did not succeed in operation S1104, the controller 180 of the foldable device 100 may maintain the lock state of the display unit 115 in operation S1107.

For example, the controller 180 may maintain the lock state and display, on the display unit 115, a screen indicating that the biometric information does not match. Also, the controller 180 may display, on the display unit 115, a screen requesting for user authentication again or a screen requesting to input a pre-stored password.

Figure 11A:
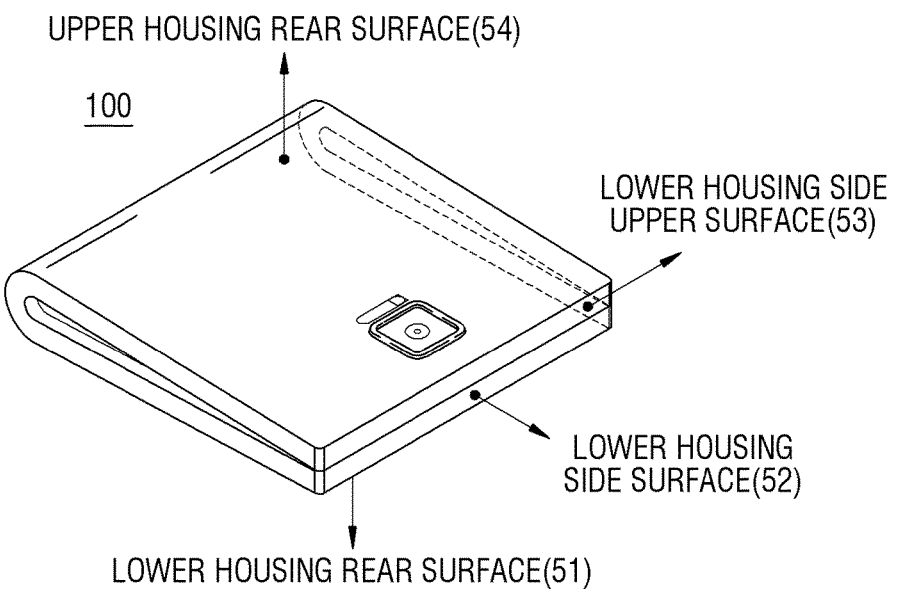
FIGS. 11A and 11B are diagrams for describing an arrangement location of a biometric information recognizer, according to exemplary embodiments.
Figure 11B:
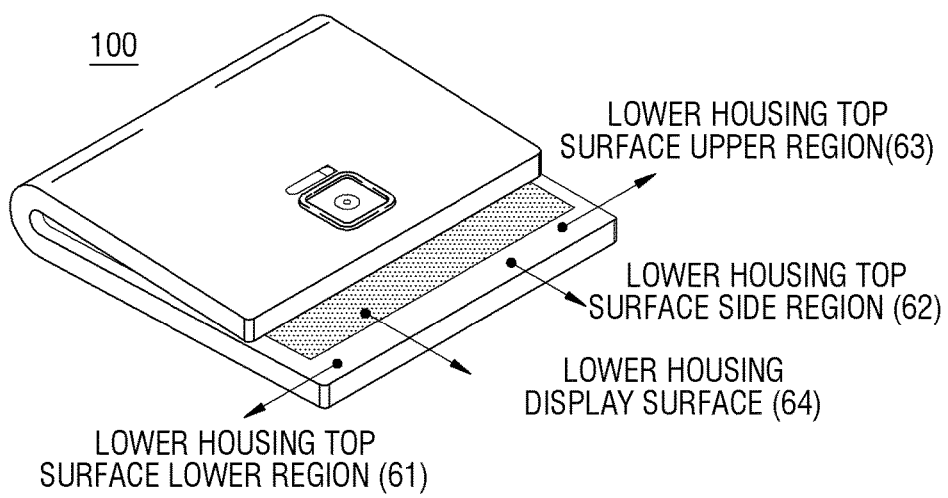

FIGS. 11A and 11B are diagrams illustrating an arrangement location of the biometric information recognizer 195, according to one or more exemplary embodiments. The biometric information recognizer 195 may include the fingerprint recognizing sensor 196 and the iris recognizing camera 197 as described above with reference to FIG. 3.

According to an exemplary embodiment, the foldable device 100 may be symmetrical (FIG. 11A) or asymmetrical (FIG. 11B).

The biometric information recognizer 195 may be arranged in the foldable device 100 in any one of various forms.

Referring to FIG. 11A, the biometric information recognizer 195 may be disposed on a lower housing rear surface 51 of a device region disposed below, when the foldable device 100 is folded.

For example, when the fingerprint recognizing sensor 196 is disposed on the lower housing rear surface 51, the foldable device 100 may be unfolded while an index finger of the user is touching the lower housing rear surface 51. In this case, the user may unfold the foldable device 100 to perform the user authentication while releasing the display unit 115 from the lock state.

Alternatively, the biometric information recognizer 195 may be disposed on a lower housing side surface 52 of a device region disposed below when the foldable device 100 is folded. For example, when the fingerprint recognizing sensor 196 is disposed on the lower housing side surface 52, the foldable device 100 may be unfolded while a thumb of the user contacts the lower housing side surface 52.

Alternatively, the biometric information recognizer 195 may be disposed on a lower housing side upper surface 53 of a device region disposed below, when the foldable device 100 is folded. For example, when the fingerprint recognizing sensor 196 is disposed on the lower housing side upper surface 53, the foldable device 100 may be unfolded while an index finger of the user contacts the lower housing side upper surface 53.

Alternatively, the biometric information recognizer 195 may be disposed on an upper housing rear surface 54 of a device region disposed above when the foldable device 100 is folded. For example, the iris recognizing camera 197 may be disposed on the upper housing rear surface 54.

The foldable device 100 that is asymmetrical as shown in FIG. 11B may include the biometric information recognizer 195 at a location corresponding to the foldable device 100 that is symmetrical as shown in FIG. 11A.

Also, when the foldable device 100 is asymmetrical, the biometric information recognizer 195 may be disposed on a lower housing top surface lower region 61 of a device region disposed below when the foldable device 100 is folded. For example, when the fingerprint recognizing sensor 196 is disposed on the lower housing top surface lower region 61, the foldable device 100 may be unfolded while a thumb of the user contacts the lower housing top surface lower region 61. Also, the fingerprint recognizing sensor 196 may operate even while the foldable device 100 is folded.

The biometric information recognizer 195 may be disposed on a lower housing top surface side region 62 of a device region disposed below when the foldable device 100 is folded. For example, when the fingerprint recognizing sensor 196 is disposed on the lower housing top surface side region 62, the foldable device 100 may be unfolded while the thumb of the user contacts the lower housing top surface side region 62. The fingerprint recognizing sensor 196 may operate even while the foldable device 100 is folded.

The biometric information recognizer 195 may be disposed on a lower housing top surface upper region 63 of a device region disposed below when the foldable device 100 is folded.

For example, when the iris recognizing camera 197 is disposed on the lower housing top surface upper region 63, an image of an eye of the user may be obtained through the iris recognizing camera 197 when the user holds and unfolds the foldable device 100. The iris recognizing camera 197 may operate even when the foldable device 100 is folded.

Figure 14:
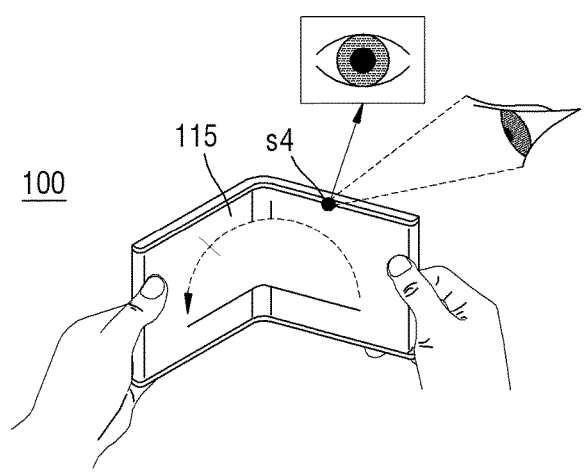

When the iris recognizing camera 197 is disposed on the lower housing top surface upper region 63 of the foldable device 100, the image of the eye of the user may be obtained through the iris recognizing camera 197 when the user unfolded the foldable device 100 at least a predetermined angle. FIG. 14 illustrates an example in which the iris recognizing camera 197 is disposed on a lower housing top surface upper region s4.

When the fingerprint recognizing sensor 196 is disposed on the lower housing top surface upper region 63, the foldable device 100 may be unfolded while the thumb of the user contacts the lower housing top surface upper region 63. Also, the foldable device 100 may operate even when the foldable device 100 is folded.

The biometric information recognizer 195 may be disposed inside a lower housing display surface 64 exposed from a device region disposed below when the foldable device 100 is folded.

For example, when the fingerprint recognizing sensor 196 is disposed on the lower housing display surface 64, the foldable device 100 may be unfolded while the thumb of the user contacts the lower housing display surface 64. The fingerprint recognizing sensor 196 may operate even when the foldable device 100 is folded.

FIGS. 12 to 18 are diagrams illustrating user authentication using biometric information, according to one or more exemplary embodiments.

FIG. 12 illustrates an example in which the fingerprint recognizing sensor 196 is disposed on a lower housing side surface s1 (i.e., the lower housing side surface 52 of FIG. 11A) of the foldable device 100.

For example, when the user holds and unfolds the foldable device 100, the thumb of the user may contact the fingerprint recognizing sensor 196 to operate the fingerprint recognizing sensor 196.

Referring to the center diagram of FIG. 12, when the foldable device 100 is unfolded at least a predetermined angle, the display unit 115 is activated and the fingerprint image i16 indicating that fingerprint recognition is being performed may be displayed on the display unit 115. The controller 180 may display the fingerprint image i16 as a moving image until user authentication is completed.

Referring to the right side of FIG. 12, when the fingerprint recognition has succeeded while the foldable device 100 is unfolded at least the predetermined angle, the foldable device 100 is released from the lock state and the pre-set wallpaper may be displayed.

FIG. 13 illustrates an example in which the iris recognizing camera 197 is disposed on a lower housing top surface upper region s3 (i.e., the lower housing top surface upper region 63 of FIG. 11B) of the foldable device 100. Also, the fingerprint recognizing sensor 196 is disposed on a lower housing display surface s2 (i.e., the lower housing display surface 64 of FIG. 11B) of the foldable device 100.

Before or while the user unfolds the foldable device 100, a finger of the user may contact the fingerprint recognizing sensor 196 (i.e., the lower housing display surface s2), and the fingerprint recognizing sensor 196 may be activated. Also, before or while the user unfolds the foldable device 100, an eye image of the user may be obtained through the iris recognizing camera 197 on the lower housing top surface upper region s3.

Referring to FIG. 13, when the foldable device 100 is unfolded at least a predetermined angle, the display unit 115 is activated, and the fingerprint image i17 indicating that fingerprint recognition is being performed and the iris image i18 indicating that iris recognition is being performed may be displayed on the display unit 115. The controller 180 may display the fingerprint image i17 and the iris image i18 as moving images until user authentication is completed.

Referring to FIG. 13, when it is determined that the user authentication has succeeded through the fingerprint recognition and the iris recognition while the foldable device 100 is unfolded within a predetermined angle range, the foldable device 100 is released from the lock state and the pre-set wallpaper may be displayed.

FIG. 14 illustrates an example in which the iris recognizing camera 197 is disposed on the lower housing top surface upper region s4.

For example, when the iris recognizing camera 197 is disposed on the lower housing top surface upper region s4 of the foldable device 100, the iris recognizing camera 197 may obtain the eye image of the user while the foldable device 100 is unfolded at least the predetermined angle.

Figure 15:
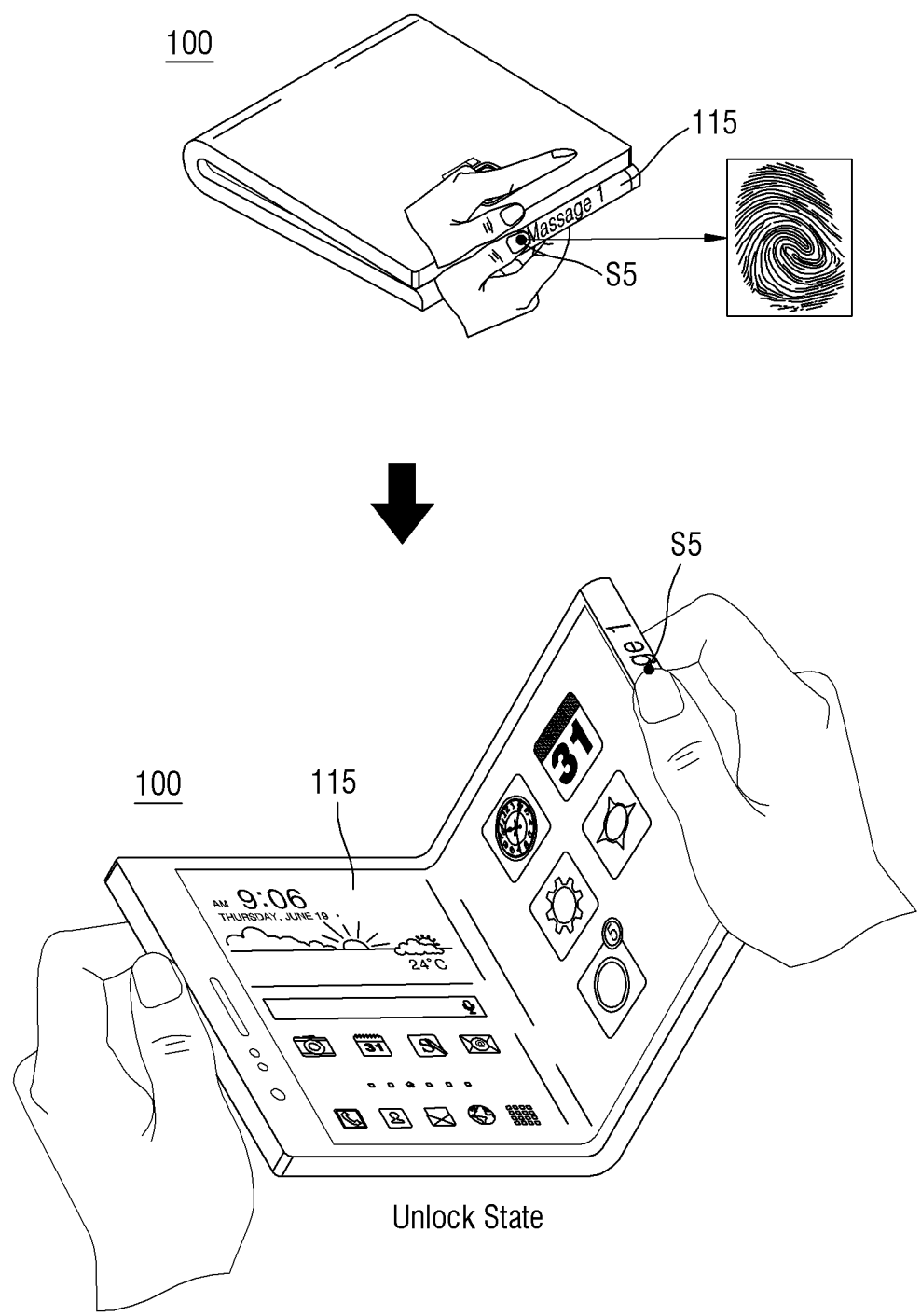

FIG. 15 illustrates an example in which the fingerprint recognizing sensor 197 is disposed in an edge display surface s5.

As shown in FIG. 15, the edge display surface s5 may be provided at one corner surface of the foldable device 100 and may be exposed even when the foldable device 100 is folded and/or unfolded. The edge display surface s5 may be a display region provided on an extending line of a display surface externally exposed while the foldable device 100 is unfolded and curved at least a predetermined angle.

For example, when the fingerprint recognizing sensor 196 is disposed on the edge display surface s5, the foldable device 100 may be unfolded while the thumb of the user contacts the fingerprint recognizing sensor 196 on the edge display surface s5.

Also, the fingerprint recognizing sensor 196 may operate even when the foldable device 100 is folded.

As shown in FIG. 15, when it is determined that user authentication has succeeded through fingerprint recognition while the foldable device 100 is unfolded to within a predetermined angle range, the foldable device 100 is released from the lock state and the pre-set wallpaper may be displayed.

Figure 16:
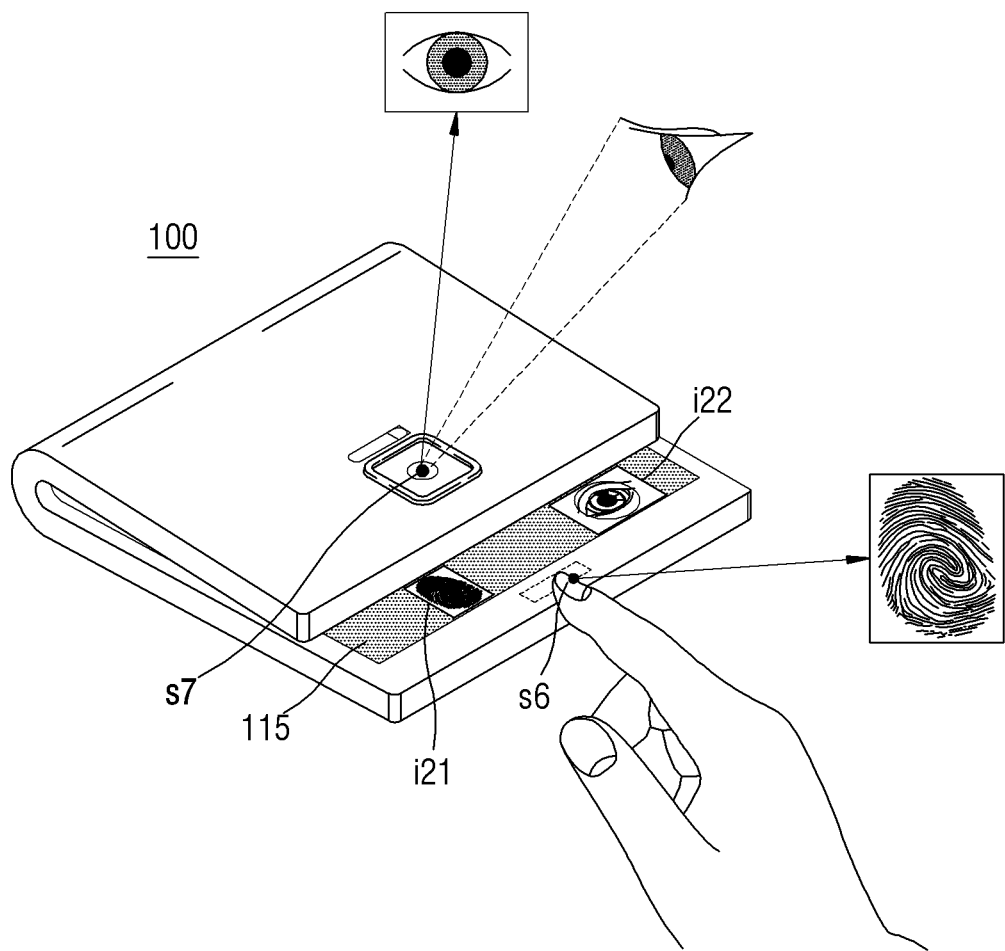

FIG. 16 illustrates an example in which the iris recognizing camera 197 is disposed on an upper housing rear surface s7 (i.e., the upper housing rear surface 54 of FIG. 11A) of the foldable device 100. Also, the fingerprint recognizing sensor 196 may be disposed on a lower housing top surface side region s6 (i.e., the lower housing top surface side region 62 of FIG. 11B) of the foldable device 100.

According to an exemplary embodiment, user authentication may be performed while the foldable device 100 is folded. For example, fingerprint authentication may be performed when the user contacts a finger on the fingerprint recognizing sensor 196 while the foldable device 100 is folded. Here, the foldable device 100 may obtain an eye image of the user through the iris recognizing camera 197 and perform iris authentication.

The controller 180 may display images i21 and i22 indicating that the user authentication is being performed on the display unit 115 exposed while the foldable device 100 is folded. The controller 180 may display the images i21 and i22 as moving images until the user authentication is completed.

Figure 18:
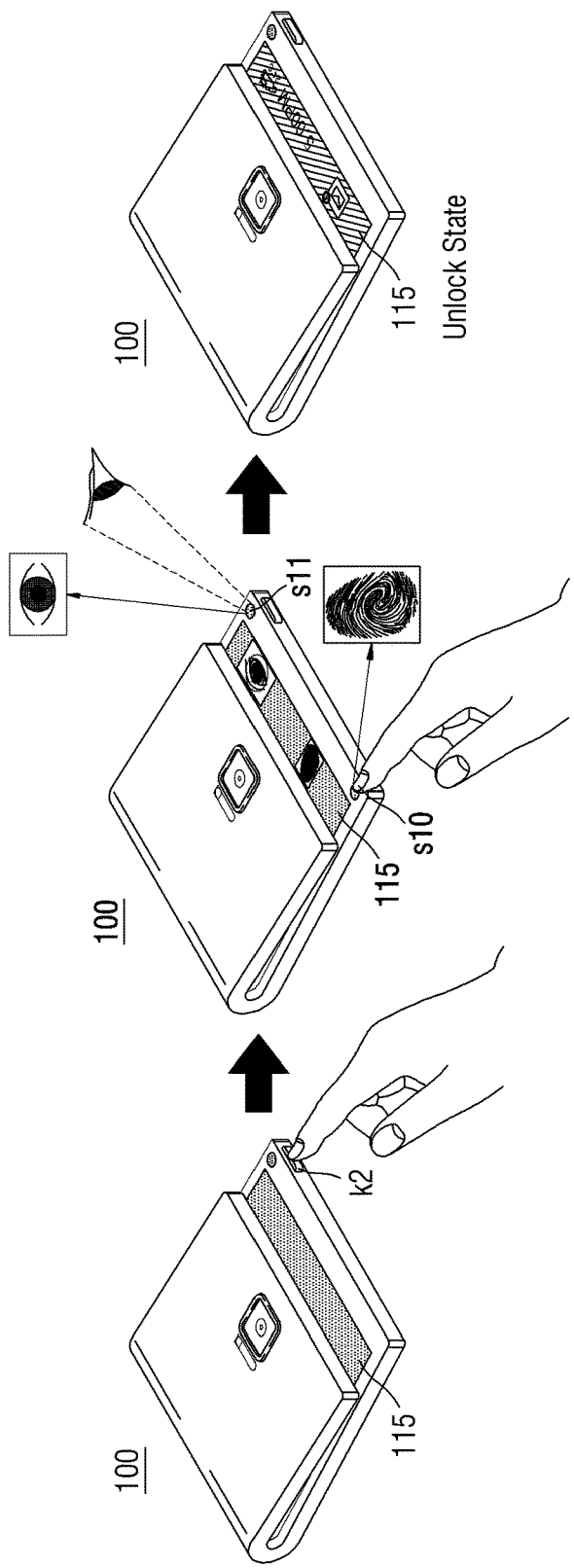

FIGS. 17 and 18 illustrate examples in which the display unit 115 exposed while the foldable device 100 is folded is released from the lock state through user authentication.

In FIG. 17, the iris recognizing camera 197 is disposed on a lower housing side surface upper region s9 (the lower housing top surface upper region 63 of FIG. 11B) of the foldable device 100. Also, the fingerprint recognizing sensor 196 may be disposed on a lower housing top surface lower region s8 (i.e., the lower housing top surface lower region 61 of FIG. 11B) of the foldable device 100.

Referring to FIG. 17, a button k1 (e.g., a home key or a power key) may be disposed on a lower housing top surface lower region (i.e., the lower housing top surface lower region 61 of FIG. 11B) of the foldable device 100. In this case, the user may press the button k1 to activate a display region of the display unit 115, which is exposed when the foldable device 100 is folded. Also, a finger of the user may contact the button k1 to activate the fingerprint recognizing sensor 196 disposed at the same location.

Referring to FIG. 18, the foldable device 100 may receive an input of a power key k2 to activate the display region of the display unit 115, which is exposed when the foldable device 100 is folded. Also, a finger of the user may contact a fingerprint recognizing sensor s10 to perform fingerprint recognition.

As shown in FIGS. 17 and 18, when it is determined that user authentication has succeeded by using fingerprint recognition and iris recognition, the foldable device 100 releases the display region from the lock state and display an interface pre-set to be displayed in the unlock state.

Figure 19:
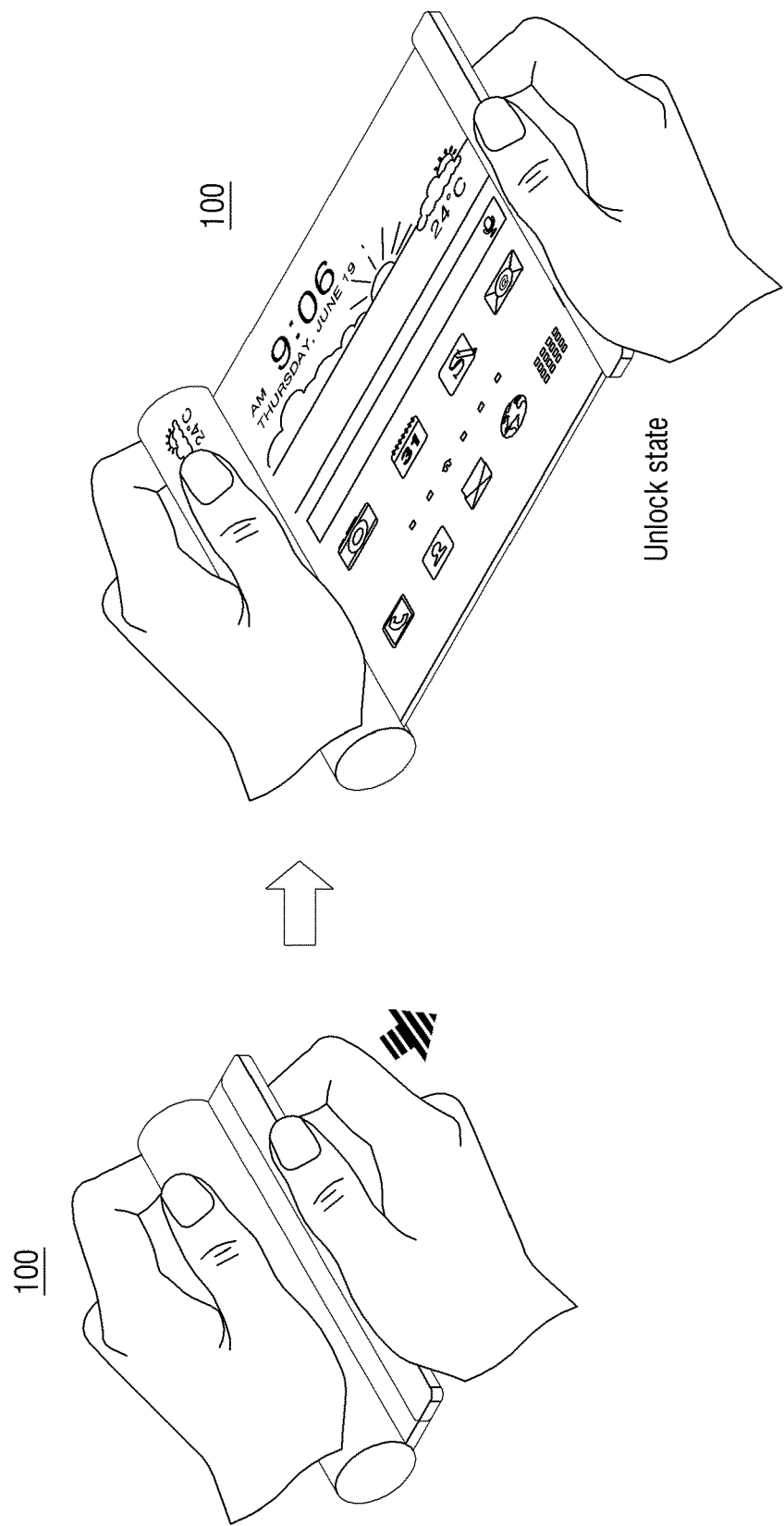

FIGS. 19 to 21 are diagrams illustrating an example in which the display unit 115 is released from the lock state as the foldable device 100 is unfolded, according to one or more exemplary embodiments.

According to an exemplary embodiment, the foldable device 100 may be realized as a rollable device. As shown in FIG. 19, the foldable device 100 may include a rollable display and a housing region into which the rollable display is rolled.

The foldable device 100 may be unrolled as the user pulls the rollable display rolled into the housing region. As another example, the foldable device 100 may be unrolled according to a user input of pressing a button provided on the foldable device 100.

Referring to FIG. 19, when the foldable device 100 is unrolled as the rollable display rolled into the housing region is pulled, the display unit 115 may be released from the lock state.

According to an exemplary embodiment, when the user unrolls the foldable device 100 to use the foldable device 100, the display unit 115 may be quickly and conveniently released from the lock state without having to perform a separate input (e.g., a password input or a pattern input) for releasing the display unit 115 from the lock state.

FIGS. 20 and 21 illustrate examples in which the display unit 115 is released from the lock state as user authentication is performed by using biometric information while the foldable device 100 is unrolled.

According to an exemplary embodiment, the foldable device 100 may include the biometric information recognizer 195. The biometric information recognizer 195 may include the fingerprint recognizing sensor 196 and the iris recognizing camera 197 as described above with reference to FIG. 3.

The biometric information recognizer 195 may be utilized during an unfolding operation of the foldable device 100. Accordingly, the user may recognize that the user authentication is performed while the foldable device 100 is unrolled.

FIGS. 20 and 21 illustrate arrangement examples of the biometric information recognizer 195, but exemplary embodiments are not limited thereto.

Referring to FIG. 20, the fingerprint recognizing sensor 196 may be disposed at a location where a finger of the user contacts to unroll the foldable device 100 by pulling the display region. For example, the fingerprint recognizing sensor 196 on a surface s13 may be provided at one region on a housing or inside a display provided on the housing where a finger contacts to unroll the foldable device 100. The fingerprint recognizing sensor 196 may be disposed on a bezel region s14 of a display rolled into the housing.

As a finger of the user contacts the fingerprint recognizing sensor 196 before or while the user unrolls the foldable device 100, the fingerprint recognizing sensor 196 may be activated.

The controller 180 may display an image i24 indicating that the user authentication is being performed, on the display unit 115 provided on the housing exposed while the foldable device 100 is rolled. The controller 180 may display the image i24 as a moving image until the user authentication is completed.

Referring to FIG. 20, when it is determined that fingerprint authentication has succeeded while the foldable device 100 is unrolled, the foldable device 100 is released from the lock state and the pre-set wallpaper may be displayed.

Referring to FIG. 21, the iris recognizing camera 197 on a surface s16 may be disposed on an upper region of a housing.

According to an exemplary embodiment, when the user unrolls the foldable device 100, the iris recognizing camera 197 may be activated. While the foldable device 100 is unrolled, the iris recognizing camera 197 may obtain an eye image of the user and iris authentication may be performed according to control of the controller 180.

As another example, when the foldable device 100 is unrolled as the user presses a button provided on the foldable device 100, the iris recognizing camera 197 on the surface s16 may be activated when the button is pressed.

The controller 180 may display an image i25 indicating that the user authentication is being performed, on the display unit 115 provided on the housing exposed when the foldable device 100 is rolled. The controller 180 may display the image i25 as a moving image until the user authentication is completed.

Referring to FIG. 21, when it is determined that iris authentication has succeeded while the foldable device 100 is unrolled, the foldable device 100 is released from the lock state and the pre-set wallpaper may be displayed.

The exemplary embodiments described above are only examples, and are not limiting. Also, orders of performing the operations are not limited, and some operations may be omitted, or at least one operation may be added according to one or more exemplary embodiments.

An exemplary embodiment may also be realized in a form of a computer-readable recording medium, such as a program module executed by a computer. A computer-readable recording medium may be an available medium accessible by a computer, and examples thereof include all volatile and non-volatile media and separable and non-separable media. Further, examples of the computer-readable recording medium may include a computer storage medium and a communication medium. Examples of the computer storage medium may include all volatile and non-volatile media and separable and non-separable media, which have been implemented by a method or technology, for storing information such as computer-readable commands, data structures, program modules, and other data. The communication medium may include a computer-readable command, a data structure, a program module, other data of a modulated data signal, or another transmission mechanism, and an example thereof includes an information transmission medium.

Also, "unit" may be a hardware component such as a processor and/or a circuit, and/or a software component executed by a hardware component such as a processor.

Although one or more exemplary embodiments have been shown and described, it will be understood that various changes in form and details may be made therein without departing from the spirit and scope of the inventive concept as defined by the following claims. Hence, it will be understood that exemplary embodiments described above are not limiting. For example, each component described in a single type may be executed in a distributed manner, and components described distributed may also be executed in an integrated form.

The scope of the inventive concept is indicated by the claims which will be described in the following rather than the detailed description, and it should be understood that the claims and all modifications or modified forms drawn from the concept of the claims are included in the scope of the inventive concept.

What is claimed is:

1. An electronic device, the device comprising:
a flexible display;
a first sensor configured to detect bending of the electronic device;
a second sensor configured to detect biometric information of a user; and
a processor configured to determine that the bending corresponds to unfolding of the electronic device, authenticate the user based on the biometric information while the electronic device is unfolding, and control the electronic device to provide an unlocked screen on the flexible display in response to authenticating the user when the electronic device is unfolded.

2. The device as claimed in claim 1, wherein the processor is further configured to determine that the electronic device is unfolded if an unfolded angle of the electronic device is greater than or equal to a predetermined first angle based on the bending sensed by the first sensor.

3. The device as claimed in claim 2, wherein the second sensor is positioned on a bezel of the electronic device.

4. The device as claimed in claim 2, wherein the second sensor comprises at least one of a fingerprint recognition sensor configured to sense fingerprint information of the user and an iris recognition sensor configured to sense iris information of the user.

5. The device as claimed in claim 2, wherein the processor is further configured to determine the unfolded angle sensed being a second angle which is predetermined and less than the first angle, and to control the flexible display to provide a screen that indicates user authentication is in progress while the electronic device is unfolding, in response to determining the unfolded angle being the second angle.

6. The device as claimed in claim 5, wherein the screen indicating that the user authentication is in progress comprises an image which changes in accordance with increase in the unfolded angle of the electronic device based on the bending sensed by the first sensor.

7. The device as claimed in claim 5, wherein the screen indicating that the user authentication is in progress comprises an image corresponding to the biometric information required to authenticate the user.

8. The device as claimed in claim 1, wherein the unlocked screen comprises a background, and
wherein processor is further configured to control the flexible display to provide a locked screen if the user is not authenticated, and the locked screen is one of a screen indicating that the authenticating is unsuccessful, a screen re-requesting user authentication, and a screen requesting input of a prestored password.

9. A method of unlocking an electronic device including a flexible display, the method comprising:
detecting bending of the electronic device;
detecting biometric information of a user;
determining that the bending corresponds to unfolding of the electronic device;
authenticating the user based on the biometric information while the electronic device is unfolding; and
providing an unlocked screen on the flexible display in response to authenticating the user when the electronic device is unfolded.

10. The method as claimed in claim 9, wherein the determining that the bending corresponds to unfolding of the electronic device comprises, determining that the device is unfolded if an unfolded angle of the electronic device is greater than or equal to a predetermined first angle based on the bending.

11. The method as claimed in claim 10, wherein the detecting biometric information comprises sensing the biometric information through a sensor positioned on a bezel of the electronic device.

12. The method as claimed in claim 10, wherein the detecting biometric information comprises sensing the biometric information through at least one of a fingerprint recognition sensor configured to sense fingerprint information of the user and an iris recognition sensor configured to sense iris information of the user.

13. The method as claimed in claim 10, further comprising:
determining the unfolded angle being a second angle which is predetermined and less than the first angle; and
providing a screen that indicates user authentication is in progress while the electronic device is unfolding, in response to determining the unfolded angle being the second angle.

14. The method as claimed in claim 13, wherein the screen indicating that the user authentication is in progress comprises an image which changes in accordance with increase in the unfolded angle of the electronic device based on the bending.

15. The method as claimed in claim 13, wherein the screen indicating that the user authentication is in progress comprises an image corresponding to the biometric information required to authenticate the user.

16. The method as claimed in claim 9, wherein the unlock screen comprises a background, and
wherein the method further comprises providing a locked screen if the user is not authenticated by the authenticating, and the locked screen is one of a screen indicating that the authenticating is unsuccessful, a screen re-requesting user authentication, and a screen requesting input of a prestored password.

\* \* \* \* \*